United States Patent
Fujita et al.

(10) Patent No.: US 10,179,592 B2
(45) Date of Patent: Jan. 15, 2019

(54) VEHICLE NOTIFICATION DEVICE AND VEHICLE NOTIFICATION METHOD

(71) Applicant: CLARION CO., LTD., Saitama-shi (JP)

(72) Inventors: Yasuhiro Fujita, Kashiwa (JP); Takeshi Hashimoto, Motomiya (JP); Kenji Kono, Tokyo (JP)

(73) Assignee: CLARION CO., LTD., Saitama-Shi (JP)

( * ) Notice: Subject to any disclaimer, the term of this patent is extended or adjusted under 35 U.S.C. 154(b) by 0 days.

(21) Appl. No.: 15/778,224

(22) PCT Filed: Nov. 2, 2016

(86) PCT No.: PCT/JP2016/082694
§ 371 (c)(1),
(2) Date: May 23, 2018

(87) PCT Pub. No.: WO2017/094433
PCT Pub. Date: Jun. 8, 2017

(65) Prior Publication Data
US 2018/0345993 A1 Dec. 6, 2018

(30) Foreign Application Priority Data
Nov. 30, 2015 (JP) ................ 2015-232633

(51) Int. Cl.
*B60Q 1/00* (2006.01)
*B60W 50/16* (2012.01)
*B60N 2/90* (2018.01)

(52) U.S. Cl.
CPC .............. *B60W 50/16* (2013.01); *B60N 2/90* (2018.02); *B60N 2002/981* (2018.02); *B60W 2520/04* (2013.01)

(58) Field of Classification Search
CPC ........ B60N 2/90; B60N 2/976; B60N 2/0232; B60D 15/029; G08B 6/00; G08G 1/167; A63F 13/06
(Continued)

(56) References Cited

U.S. PATENT DOCUMENTS 8,405,522 B2 * 3/2013 Shaffer ................. G08G 1/167
340/4.12
8,942,892 B2 * 1/2015 Veen .................... B60N 2/0232
701/49

(Continued)

FOREIGN PATENT DOCUMENTS

JP 2007-90956 4/2007
JP 2007-257505 10/2007

(Continued)

OTHER PUBLICATIONS

International Search Report for corresponding International Application No. PCT/JP2016/082694, dated Dec. 27, 2016.

(Continued)

*Primary Examiner* — Hoi Lau
(74) *Attorney, Agent, or Firm* — Mori & Ward, LLP

(57) ABSTRACT

To make a notification to the driver so that the driver can distinguish or recognize the notification. A vehicle notification device (1a) inputs a first sweep signal whose frequency is changed in a predetermined frequency range, to a vibrator (4), calculates frequency characteristics of a vibration in the vehicle interior, detects a frequency range in which the signal level of vehicle-travel-time frequency characteristics is higher than the signal level of vehicle-stop-time frequency characteristics by a predetermined level amount or more, generates a second sweep signal whose frequency is changed in a range obtained by excluding the detected frequency range from the predetermined frequency range of (Continued)

the first sweep signal, and outputs the second sweep signal from the vibrator (4).

7 Claims, 16 Drawing Sheets

(58) Field of Classification Search
USPC ............ 340/438, 4.2, 4.12, 905, 901, 407.1, 340/425.5
See application file for complete search history.

(56) References Cited

U.S. PATENT DOCUMENTS

| | | | | |
|---|---|---|---|---|
| 9,120,462 | B2* | 9/2015 | Jonsson | B60W 50/14 |
| 9,123,215 | B2* | 9/2015 | Kiefer | G08B 6/00 |
| 9,153,108 | B2* | 10/2015 | Kiefer | B60N 2/90 |
| 9,266,451 | B2* | 2/2016 | Kiefer | B60N 2/976 |
| 9,349,263 | B2* | 5/2016 | Kiefer | G08B 6/00 |
| 9,358,925 | B2* | 6/2016 | Kariatsumari | B62D 15/029 |
| 2011/0248817 | A1* | 10/2011 | Houston | A63F 13/06 340/4.2 |
| 2012/0033076 | A1* | 2/2012 | Nakamura | B60W 10/06 348/148 |
| 2012/0081234 | A1* | 4/2012 | Shaffer | G08G 1/167 340/905 |
| 2012/0232780 | A1* | 9/2012 | Delson | A63F 13/06 701/400 |
| 2013/0342330 | A1* | 12/2013 | Kiefer | B60N 2/90 340/407.1 |
| 2013/0342339 | A1* | 12/2013 | Kiefer | G08B 6/00 340/438 |
| 2013/0342366 | A1* | 12/2013 | Kiefer | G08B 6/00 340/901 |
| 2014/0253302 | A1* | 9/2014 | Levesque | G08B 6/00 340/407.1 |
| 2015/0109114 | A1* | 4/2015 | Kariatsumari | B62D 15/029 340/425.5 |

FOREIGN PATENT DOCUMENTS

| | | |
|---|---|---|
| JP | 2008-84219 | 4/2008 |
| JP | 2008-260444 | 10/2008 |
| JP | 2009-298281 | 12/2009 |
| JP | 2012-35793 | 2/2012 |

OTHER PUBLICATIONS

Written Opinion for corresponding International Application No. PCT/JP2016/082694, dated Dec. 27, 2016.

* cited by examiner

VEHICLE NOTIFICATION DEVICE AND VEHICLE NOTIFICATION METHOD

TECHNICAL FIELD

The present invention relates to a vehicle notification device and a vehicle notification method. More specifically, the present invention relates to a vehicle notification device and a vehicle notification method that are able to cause a vibrator disposed in a seat in the vehicle interior to generate a notification vibration, by inputting a sweep signal obtained by changing the frequency from an initial frequency to a target frequency, to the vibrator.

BACKGROUND ART

Among known conventional structures that, during vehicle travel, notifies the driver that the vehicle has departed from the lane are rumble strips, which form a wavy surface in the center, shoulder, or other areas of the road in advance and intentionally generate vibrations and vibration sounds when the vehicle passes over the wavy surface.

Also, there is known a vehicle notification device that notifies the driver by recognizing the lane ahead of the vehicle by image analysis using a camera or by other means and emitting a notification sound, notification light, or the like when the vehicle departs from the lane, rather than forming a wavy surface in the road surface in advance. Among proposed methods for notifying the driver without emitting a notification sound or notification light are notification devices that notify the driver by driving a vibration motor disposed in a seat.

Examples of such notification devices include those that include vibration mechanisms disposed in different two interior members in the vehicle interior and notify the driver of a dangerous situation by moving a vibration from one vibration mechanism to the other vibration mechanism (for example, see Patent Literature 1).

There have been also proposed vehicle alarm devices that alarm the driver by vibrating a power seat using a motor for driving the seat (for example, see Patent Literature 2).

CITATION LIST

Patent Literature

PTL 1: Japanese Unexamined Patent Application Publication No. 2009-298281
PTL 2: Japanese Unexamined Patent Application Publication No. 2008-260444

SUMMARY OF INVENTION

Technical Problem

The notification devices and alarm devices described above have difficulty in performing precise vibration control using only the vibration of a motor or the like and therefore increasing the distinguishability or recognizability of a vibration by the driver.

A notification vibration or alarm vibration may be cancelled or reduced by a vibration (road noise, etc.) transmitted from the road surface during vehicle travel. The cancellation of a notification vibration or alarm vibration by a vibration from the road surface is commonly called "masking" of the notification vibration or alarm vibration. If a notification vibration or alarm vibration is masked by a vibration from the road surface during vehicle travel, the driver may not sufficiently distinguish or recognize the notification vibration or alarm vibration.

Conceivable methods for avoiding a reduction in the distinguishability or recognizability of a notification vibration or alarm vibration due to masking or the like include a notification method using not only a vibration but also auditory means such as an alarm sound. However, if an alarm sound is used for notification, a passenger other than the driver would also become aware of the alarm sound and thus rather feel annoyed (uncomfortable) or anxious.

Another method is to form a wavy surface on the lane using rumble strips. When the vehicle travels over the wavy surface, the entire vehicle generates vibrations and vibration sounds, allowing for an increase in the driver alarming effect. However, it is not realistic to form a wavy surface on all lanes. Further, vibrations and vibration sounds generated by rumble strips have difficulty in alarming the driver alone. That is, a passenger would also distinguish or recognize vibrations and vibration sounds and thus feel uncomfortable or anxious.

The present invention has been made in view of the above problems, and an object thereof is to provide a vehicle notification device and a vehicle notification method that are able to make a notification to the driver in such a manner that the notification is distinguished or recognized by the driver alone and not distinguished or recognized by a passenger.

Solution to Problem

To solve the above problems, one aspect of the present invention provides a vehicle notification device including a vibrator disposed in a seat in a vehicle interior, a signal generator configured to generate a first sweep signal by changing a frequency in a predetermined frequency range, a measurement unit configured to measure a vibration in the vehicle interior, a frequency analyzer configured to calculate vehicle-stop-time frequency characteristics and vehicle-travel-time frequency characteristics by measuring a vibration using the measurement unit in the vehicle interior during a vehicle stop and during vehicle travel while inputting the first sweep signal to the vibrator and to detect a frequency range in which a signal level of the vehicle-travel-time frequency characteristics is higher than a signal level of the vehicle-stop-time frequency characteristics by a predetermined level amount or more, and a frequency variable unit configured to generate a filter for limiting a signal level of the first sweep signal in the frequency range detected by the frequency analyzer and to generate a second sweep signal by applying the generated filter to the first sweep signal. The vibrator generates a notification vibration on the basis of the second sweep signal whose signal level in the frequency range detected by the frequency analyzer has been limited by filtering performed by the frequency variable unit.

To solve the above problems, another aspect of the present invention provides a vehicle notification method performed by a vehicle notification device that generates a notification vibration using a vibrator disposed in a seat in a vehicle interior. The method includes a signal generation step of generating, by a signal generator, a first sweep signal by changing a frequency in a predetermined frequency range, a measurement step of measuring, by a measurement unit, a vibration in the vehicle interior, a frequency analysis step of calculating, by a frequency analyzer, vehicle-stop-time frequency characteristics and vehicle-travel-time frequency characteristics by measuring a vibration using the measurement unit in the vehicle interior during a vehicle stop and during vehicle travel while inputting the first sweep signal to the vibrator and detecting a frequency range in which a signal level of the vehicle-travel-time frequency characteristics is higher than a signal level of the vehicle-stop-time frequency characteristics by a predetermined level amount or more, a frequency variable step of generating a filter for limiting a signal level of the first sweep signal in the frequency range detected in the frequency analysis step and generating, by a frequency variable unit, a second sweep signal by applying the generated filter to the first sweep signal, and a notification vibration generation step of generating, by the vibrator, a notification vibration on the basis of the second sweep signal whose signal level in the frequency range detected in the frequency analysis step has been limited by filtering in the frequency variable step.

The above vehicle notification device and method detect the frequency range in which the signal level of the vehicle-travel-time frequency characteristics is higher than the signal level of the vehicle-stop-time frequency characteristics by the predetermined level amount or more. If the signal level of the vehicle-travel-time frequency characteristics is higher than the signal level of the vehicle-stop-time frequency characteristics by the predetermined level amount or more, it can be determined that a notification vibration generated by the vibrator on the basis of the sweep signal is being masked by a vibration inputted and transmitted from the road surface during vehicle travel (the notification vibration is not being felt by the driver). Accordingly, if a notification vibration is generated on the basis of a sweep signal in the frequency range in which the notification vibration will be masked, it is difficult to make a sufficient notification to the passenger sitting on the seat.

For this reason, the vehicle notification device and vehicle notification method generate a filter for limiting the level of the first sweep signal in the frequency range detected by the frequency analyzer. The vehicle notification device and vehicle notification method then generate a second sweep signal by applying the filter to the first sweep signal and cause the vibrator to generate a notification vibration on the basis of the generated second sweep signal. By using the second sweep signal thus filtered, a notification vibration can be actively generated in the frequency range except for the frequency range in which masking occurs. Thus, the distinguishability or recognizability of a notification vibration by the passenger sitting on the seat can be increased.

The vehicle notification device and vehicle notification method generate a sweep signal as an input signal for causing the vibrator to generate a notification vibration, using the signal generator. By generating a sweep signal and inputting the sweep signal to the vibrator, a notification vibration can be outputted (generated) using resonant properties of the seat or the like in which the vibrator is disposed. Thus, even if the level of the sweep signal inputted to the vibrator is low, a notification vibration can be increased using the resonant properties. Also, the distinguishability or recognizability of a notification vibration by the driver can be further increased. Also, since a large notification vibration can be generated even if the level of the sweep signal is low, the output of the power amplifier can be reduced, resulting in power savings.

Another aspect of the present invention provides a vehicle notification device including a vibrator disposed in a seat in a vehicle interior, a first signal generator configured to generate a first sweep signal by changing a frequency in a predetermined frequency range, a measurement unit configured to measure a vibration in the vehicle interior, a frequency analyzer configured to calculate vehicle-stop-time frequency characteristics and vehicle-travel-time frequency characteristics by measuring a vibration using the measurement unit in the vehicle interior during a vehicle stop and during vehicle travel while inputting the first sweep signal to the vibrator and to detect a frequency range in which a signal level of the vehicle-travel-time frequency characteristics is higher than a signal level of the vehicle-stop-time frequency characteristics by a predetermined level amount or more, and a second signal generator configured to generate a second sweep signal by changing a frequency in a new frequency range obtained by excluding the frequency range detected by the frequency analyzer from the predetermined frequency range in which the frequency of the first sweep signal is changed. The vibrator generates a notification vibration on the basis of the second sweep signal generated by the second signal generator.

Further, yet another aspect of the present invention provides a vehicle notification method performed by a vehicle notification device that generates a notification vibration using a vibrator disposed in a seat in a vehicle interior. The method includes a first signal generation step of generating, by a first signal generator, a first sweep signal by changing a frequency in a predetermined frequency range, a measurement step of measuring, by a measurement unit, a vibration in the vehicle interior, a frequency analysis step of calculating, by a frequency analyzer, vehicle-stop-time frequency characteristics and vehicle-travel-time frequency characteristics by measuring a vibration using the measurement unit in the vehicle interior during a vehicle stop and during vehicle travel while inputting the first sweep signal to the vibrator and detecting a frequency range in which a signal level of the vehicle-travel-time frequency characteristics is higher than a signal level of the vehicle-stop-time frequency characteristics by a predetermined level amount or more, a second signal generation step of generating, by a second signal generator, a second sweep signal by changing a frequency in a new frequency range obtained by excluding the frequency range detected in the frequency analysis step from the predetermined frequency range in which the frequency of the first sweep signal is changed, and a notification vibration generation step of generating, by the vibrator, the notification vibration on the basis of the second sweep signal generated in the second signal generation step.

The above vehicle notification device and method detect the frequency range in which the signal level of the vehicle-travel-time frequency characteristics is higher than the signal level of the vehicle-stop-time frequency characteristics by the predetermined level amount or more. If the signal level of the vehicle-travel-time frequency characteristics is higher than the signal level of the vehicle-stop-time frequency characteristics by the predetermined level amount or more, it can be determined that a notification vibration generated by the vibrator on the basis of the sweep signal is being masked by a vibration inputted and transmitted from the road surface during vehicle travel. Accordingly, if a notification vibration is generated on the basis of a sweep signal in the frequency range in which the notification vibration will be masked, it is difficult to make a sufficient notification to the passenger sitting on the seat.

The vehicle notification device and vehicle notification method generate a second sweep signal by changing the frequency in the new frequency range obtained by excluding the frequency range detected by the frequency analyzer from the predetermined frequency range in which the frequency of the first sweep signal is changed and cause the vibrator to generate a notification vibration on the basis of the second sweep signal. By using the second sweep signal generated on the basis of the new frequency range, a notification vibration can be actively generated in the frequency range except for the frequency range in which masking occurs. Also, the distinguishability or recognizability of a notification vibration by the passenger sitting on the seat can be increased.

The above vehicle notification device may include a correction processor configured to correct the second sweep signal so that an amplitude value of the second sweep signal varies with time, by multiplying the second sweep signal by a correction signal whose amplitude value varies with time. The vibrator may generates the notification vibration on the basis of the second sweep signal corrected by the correction processor.

The above vehicle notification method may include a correction step of correcting, by a correction processor, the second sweep signal so that an amplitude value of the second sweep signal varies with time, by multiplying the second sweep signal by a correction signal whose amplitude value varies with time. The notification vibration generation step may include generating, by the vibrator, the notification vibration on the basis of the second sweep signal corrected in the correction step.

The vehicle notification device and vehicle notification method correct the second sweep signal so that the amplitude value of the second sweep signal varies with time, by multiplying the second sweep signal by the correction signal whose amplitude value varies with time and cause the vibrator to generate a notification vibration on the basis of the corrected second sweep signal. By multiplying the second sweep signal by the correction signal whose amplitude value varies with time and then causing the vibrator to generate a notification vibration, the amplitude value of the notification vibration can be change with time. Thus, a notification can be made using the notification vibration whose amplitude value varies with time rather than a notification vibration whose amplitude value is constant. Also, the distinguishability or recognizability of a notification vibration by the passenger sitting on the seat can be increased.

In the above vehicle notification device, amplitude characteristics of the correction signal may be set on the basis of amplitude characteristics of a vibration that occurs in a vehicle when the vehicle passes over rumble strips.

In the above vehicle notification method, amplitude characteristics of the correction signal used in the correction step may be set on the basis of amplitude characteristics of a vibration that occurs in a vehicle when the vehicle passes over rumble strips.

The vehicle notification device and vehicle notification method set amplitude characteristics of the correction signal on the basis of amplitude characteristics of a vibration that occurs in the vehicle when the vehicle passes on rumble strips. Thus, the change state of amplitude of the notification vibration generated by the vibrator can be brought close to the change state of amplitude of vibrations transmitted from the road surface to the vehicle interior and generated therein when the vehicle passes over rumble strips. Thus, the distinguishability or recognizability of a notification vibration by the passenger sitting on the seat can be further increased.

In the above vehicle notification method, the notification vibration generation step may include if the frequency analyzer does not detect the frequency range in which the signal level of the vehicle-travel-time frequency characteristics is higher than the signal level of the vehicle-stop-time frequency characteristics by the predetermined level amount or more in the frequency analysis step, generating, by the vibrator, the notification vibration using the first sweep signal as the second sweep signal.

Advantageous Effects of Invention

The vehicle notification device and vehicle notification method according to an embodiment of the present invention generate a filter for limiting the level of the first sweep signal in the frequency range detected by the frequency analyzer. The vehicle notification device and vehicle notification method then generate a second sweep signal by applying the filter to the first sweep signal and cause the vibrator to generate a notification vibration on the basis of the generated second sweep signal. By using the second sweep signal thus filtered, a notification vibration can be actively generated in the frequency range except for the frequency range in which masking occurs. Thus, the distinguishability or recognizability of a notification vibration by the passenger sitting on the seat can be increased.

DESCRIPTION OF EMBODIMENTS

Figure 1:
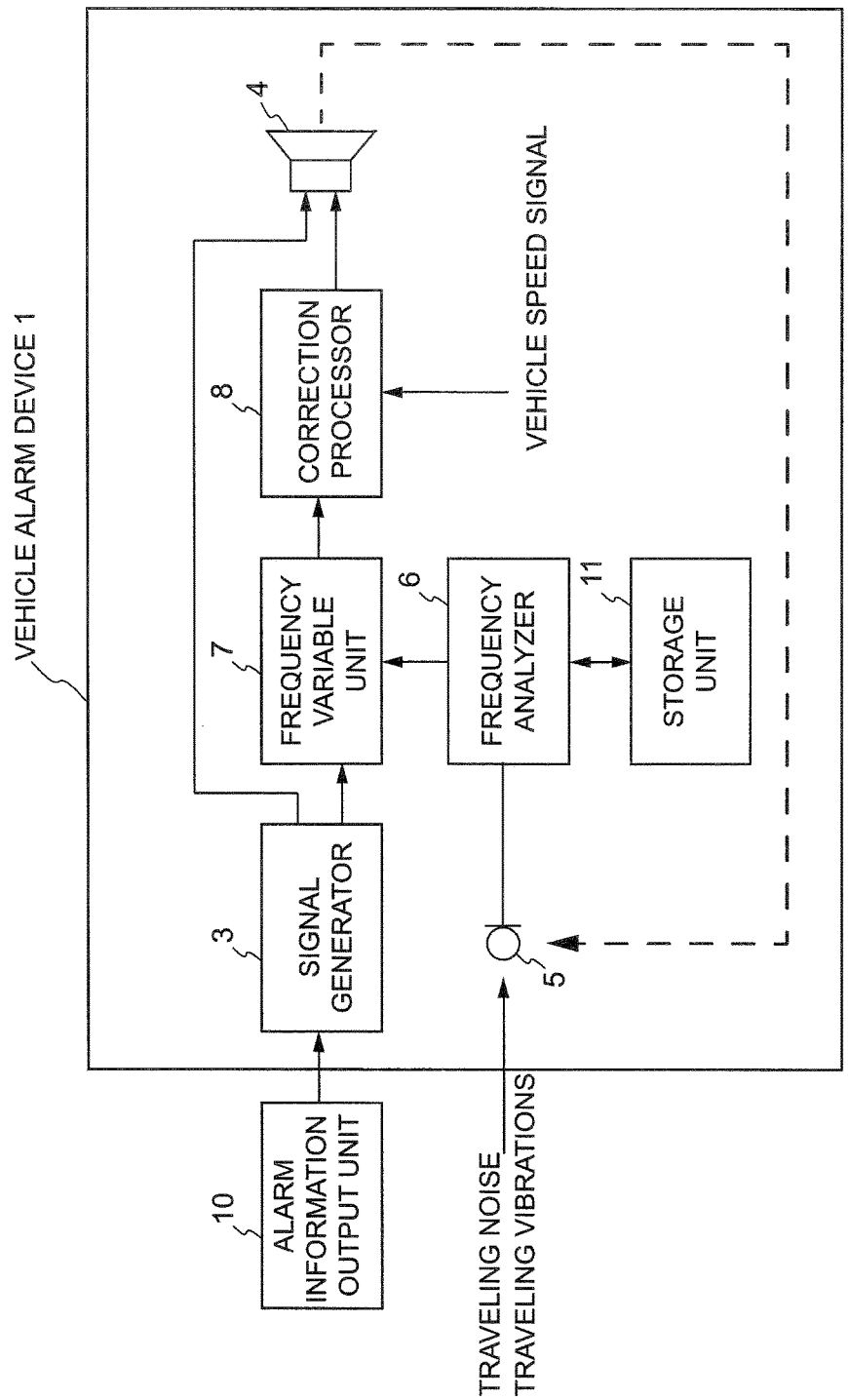
FIG. 1 is a block diagram showing a schematic configuration of a vehicle alarm device according to an embodiment.

Now, a vehicle alarm device which is an example of a vehicle notification device of the present invention will be described in detail. FIG. 1 is a block diagram showing a schematic configuration of a vehicle alarm device according to an embodiment. As shown in FIG. 1, a vehicle alarm device 1 includes a signal generator 3, an exciter (vibrator) 4, a microphone (measurement unit) 5, a frequency analyzer 6, a frequency variable unit 7, and a correction processor 8.

The vehicle alarm device 1 outputs an alarm vibration (notification vibration) from the exciter 4 and determines the masking state of a sweep signal by picking up (measuring) vibrations and sounds in the vehicle interior using the microphone 5. If it is determined that the sweep signal is being masked, the vehicle alarm device 1 outputs an alarm vibration having increased distinguishability or recognizability from the exciter 4.

Connected to the signal generator 3 is an alarm information output unit 10. The alarm information output unit 10 outputs alarm information to the signal generator 3 when alarm vibration needs to be outputted from the exciter 4. The alarm information output unit 10 outputs alarm information based on such as a lane departure signal, vehicle approach information, doze detection information, or a sharp curve signal to the sweep signal generator 3. The alarm information output unit 10 detects these alarming matters using a typical method such as a method of capturing images of the front of the vehicle and analyzing the images or a method of detecting an alarming matter by radiating a radar wave forward and measuring a reflected wave.

[Signal Generator]

Figure 2:
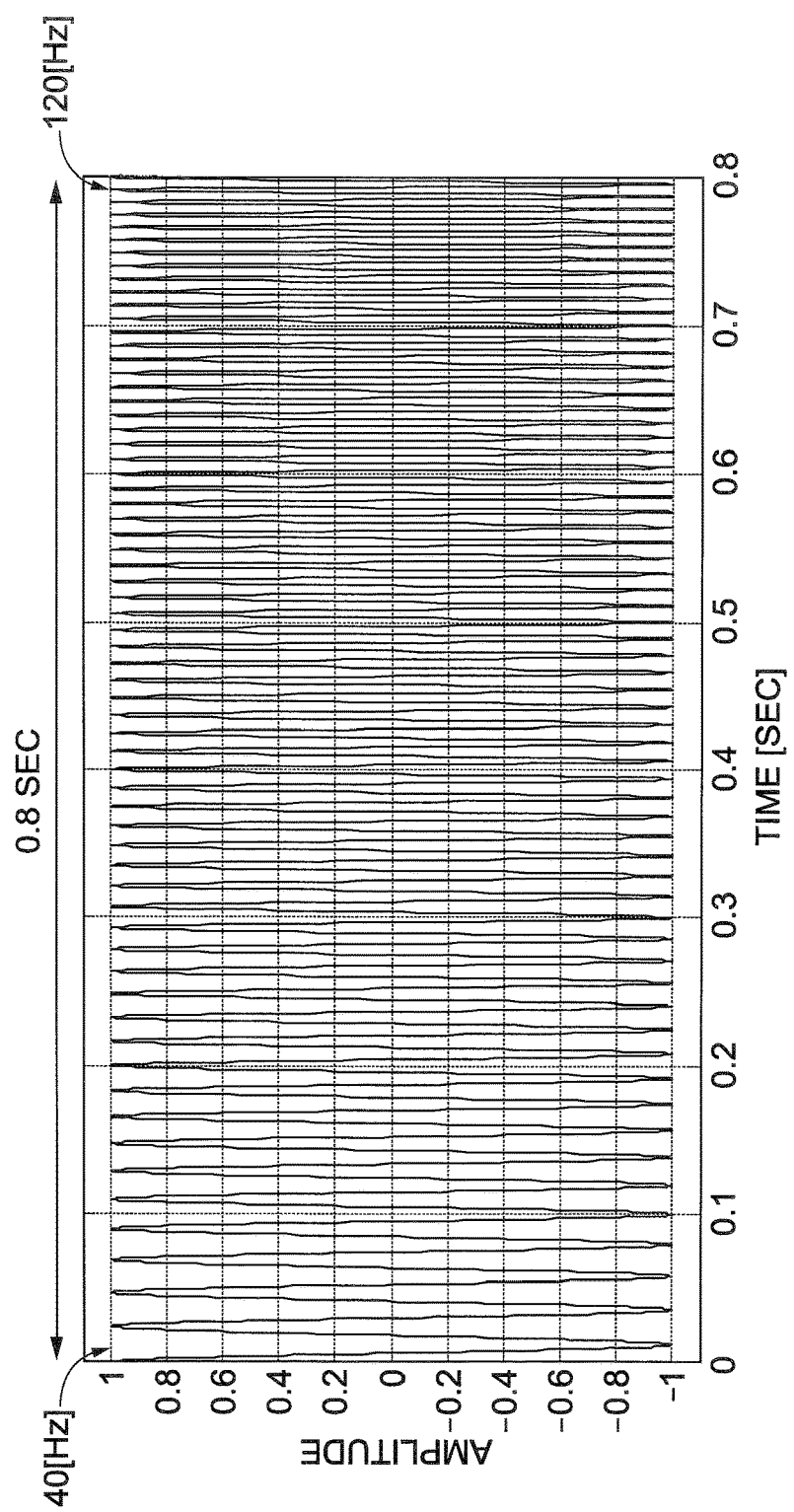
FIG. 2 is a graph showing amplitude characteristics of a sweep signal generated by changing the frequency of a sine wave from 40 Hz to 120 Hz.

The signal generator 3 has a function of generating a sweep signal consisting of a sine wave. The signal generator 3 generates a sweep signal (first sweep signal) by changing (sweeping) the frequency of a sine wave from an initial frequency of 40 Hz to a target frequency of 120 Hz in cycles of 0.8 sec. FIG. 2 shows amplitude characteristics of one cycle of a sweep signal generated by signal generator 3. The amplitude characteristics shown in FIG. 2 indicate that the frequency of the sine wave is changed from 40 Hz to 120 Hz with time. As shown in FIG. 2, the change state of the frequency can be determined on the basis of the distance between adjacent waves of the sine wave on the time axis (the horizontal axis of FIG. 2).

The signal generator 3 continuously generates the sweep signal while receiving alarm information from the alarm information output unit 10. That is, the signal generator 3 continuously generates the sweep signal by changing the frequency of the sine wave in cycles. More specifically, the signal generator 3 continuously generates the sweep signal by repeatedly changing the frequency of the sine wave from 40 Hz to 120 Hz and then back to 40 Hz.

The frequency range in which the sweep signal is generated need not be 40 Hz to 120 Hz. However, the frequency range to be swept is preferably a low frequency range so that the exciter 4 generates a vibration (alarm vibration) rather than a sound on the basis of the received sweep signal.

The sweep signal generated by the signal generator 3 is inputted to the exciter 4 or the frequency variable unit 7. When obtaining frequency characteristics in the vehicle interior during a vehicle stop, the signal generator 3 outputs the generated sweep signal to the exciter 4. The frequency characteristics in the vehicle interior during the vehicle stop are obtained (analyzed, calculated) by the frequency analyzer 6 and stored in a storage unit 11 (to be discussed later). When obtaining frequency characteristics in the vehicle interior during vehicle travel, the signal generator 3 outputs the generated sweep signal to the frequency variable unit 7.

As seen above, the signal generator 3 generates the sweep signal by changing the frequency of the sine wave from an initial frequency of 40 Hz to a target frequency of 120 Hz rather than generating a sine wave whose frequency is constant and then inputs the sweep signal to the exciter 4. Thus, the exciter 4 can output an alarm vibration whose signal level is increased using the resonant properties.

The resonant frequency, at which resonance occurs, is known to change due to the individual differences between exciters 4, variations in the material of the seat, which transmits vibrations, the differences between exciter installation positions, the aged deterioration of those members, or other reasons. Even if the resonant frequency changes, the frequency of the sweep signal can be matched to the resonant frequency, since the sweep signal is a signal obtained by changing the frequency of the sine wave. Thus, the signal level of an alarm vibration can be reliably increased using the resonant properties.

Since the signal level of an alarm vibration can be increased using resonance, a sufficiently large alarm vibration can be generated even if the level of the sweep signal is low. Thus, the distinguishability or recognizability of the alarm vibration by the driver can be further increased. Also, since a large alarm vibration can be generated even if the level of the sweep signal is low, the output of the power amplifier can be reduced, resulting in power savings.

[Exciter]

The exciter 4 has a function of receiving the sweep signal (first sweep signal) generated by the signal generator 3 or the sweep signal subjected to a correction process (to be discussed later) by the correction processor 8 and generating (outputting) an alarm vibration on the basis of the sweep signal.

The exciter 4 is an output device (vibrator) that is able to transmit a vibration force from the voice coil thereof to an object in contact with the exciter 4 so that the object outputs a vibration or sound as a diaphragm. In other words, the exciter 4 is able to transmit a vibration based on the received sweep signal through a member or the like in which the exciter 4 is installed. The exciter 4 according to the present embodiment is installed inside the driver's seat of the vehicle. For this reason, an alarm vibration generated by the exciter 4 can be transmitted to the driver through the driver's seat without another passenger becoming aware of it.

Any number of exciters may be disposed in any positions in the driver's seat as long as the driver can distinguish or recognize an alarm vibration. While, in the present embodiment, the exciter 4 is used as an example of a vibration device (vibrator) that generates an alarm vibration on the basis of an inputted sweep signal, the vibration device need not be an exciter and may be another type of device such as a dynamic speaker.

[Microphone]

The microphone 5 functions as a measurement unit that measures (picks up) noise and vibrations in the vehicle interior. During a vehicle stop, noise (traveling noise) or vibrations (traveling vibrations) associated with the traveling of the vehicle does not occur. For this reason, by measuring a vibration and noise in the vehicle interior using the microphone 5 during a vehicle stop while inputting a sweep signal to the exciter 4, frequency characteristics in the vehicle interior that have not been affected by traveling noise or traveling vibrations can be obtained. Also, by measuring vibrations and noise in the vehicle interior, including traveling noise and traveling vibrations, using the microphone 5 during vehicle travel, frequency characteristics in the vehicle interior during the vehicle travel can be obtained.

The microphone 5 may be installed in any position as long as noise and vibrations in the vehicle interior can be measured using the microphone 5 installed in that position. However, the microphone 5 is preferably installed around the driver's seat, since an alarm vibration outputted from the exciter 4 is measured during a vehicle stop.

As described above, in the present embodiment, the microphone 5 is used as a measurement unit. However, a device such as a pickup, which converts a vibration or the like into electricity, may be used as a measurement unit as long as the device can measure noise and vibrations in the vehicle interior.

[Frequency Analyzer]

The frequency analyzer 6 has a function of obtaining (calculating) frequency characteristics of noise and vibrations picked up by the microphone 5. As described above, the frequency analyzer 6 obtains frequency characteristics of vibrations and noise picked up using the microphone 5 in the vehicle interior during a vehicle stop (hereafter referred to as "vehicle-stop-time frequency characteristics") and frequency characteristics of vibrations and noise picked up using the microphone 5 in the vehicle interior during vehicle travel.

Connected to the frequency analyzer 6 is the storage unit 11. The frequency analyzer 6 is able to read and write data from and to the storage unit 11. After calculating the vehicle-stop-time frequency characteristics, the frequency analyzer 6 stores them in the storage unit 11. The storage unit 11 need not necessarily be disposed separately of the frequency analyzer 6 and may be disposed in the frequency analyzer 6 as a RAM or the like for storing data.

Figure 3:
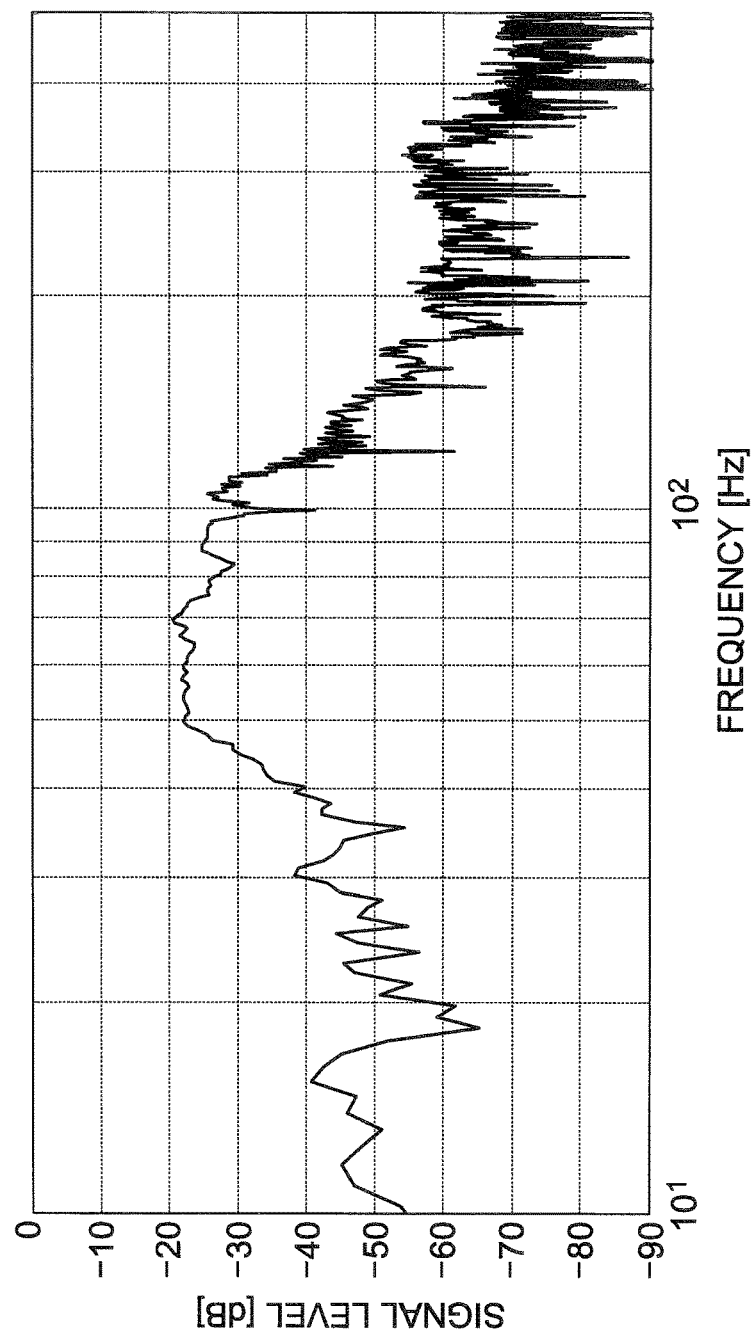
FIG. 3 is a graph showing frequency characteristics of an alarm vibration generated by inputting a sweep signal to an exciter during a vehicle stop.

FIG. 3 is a graph showing an example of the vehicle-stop-time frequency characteristics calculated by the frequency analyzer 6. The frequency characteristics shown in FIG. 3 are frequency characteristics of a sweep signal generated by changing the frequency from an initial frequency of 40 Hz to a target frequency of 120 Hz in one cycle (0.8 sec) and then inputted to the exciter 4. The frequency analyzer 6 calculates frequency characteristics by converting time-domain data of the one-cycle sweep signal (alarm vibration) into frequency-domain data as a sample block consisting of a predetermined number of samples. Accordingly, the vehicle-stop-time frequency characteristics shown in FIG. 3 indicate (include) the maximum signal level (dB) in the frequency range of 40 Hz to 120 Hz (one cycle, 0.8 sec) in which the frequency of the sweep signal is changed.

While the frequency of the sweep signal is changed in the frequency range of 40 Hz to 120 Hz, the frequency of a vibration sound or the like picked up by the microphone 5 in the vehicle interior during a vehicle stop is not limited to this frequency range. The signal levels in ranges other than the frequency range of 40 Hz to 120 Hz are shown in FIG. 3. The frequency characteristics of a range of 40 Hz or less and a range of 120 Hz or more are characteristics influenced by reflection or the like in the vehicle interior, and particular importance is not given to such characteristics in the present invention. The vehicle-stop-time frequency characteristics shown in FIG. 3 indicate that the signal level varies (is not constant) among the frequencies 40 Hz to 120 Hz. These variations are due to changes in the resonance range based on the properties of the driver's seat.

The frequency analyzer 6 also has a function of determining whether an alarm vibration is being masked, on the basis of noise, vibrations, or the like picked up by the microphone 5 during vehicle travel.

During vehicle travel, the exciter 4 receives a sweep signal and generates an alarm vibration, and the microphone 5 picks up the alarm vibration in the vehicle interior, as well as vibrations and vibration sounds from the road surface associated with the travel of the vehicle. However, the alarm vibration may be being masked by the vibrations and vibration sounds (traveling vibrations, traveling noise) from the road surface, and the driver may have difficulty in distinguishing or recognizing the alarm vibration. For this reason, the frequency analyzer 6 determines whether the alarm vibration is being masked, by obtaining the difference in signal level between frequency characteristics of the noise, vibrations, and the like picked up during the vehicle travel (hereafter referred to as "vehicle-travel-time frequency characteristics") and the vehicle-stop-time frequency characteristics stored in the storage unit 11.

In the present embodiment, it is determined on the basis of the results of traveling experiments and the like that if the amplitude of noise and vibrations, including an alarm vibration generated by the exciter 4 on the basis of a sweep signal and being masked, picked up during vehicle travel is twice or more greater than the amplitude of an alarm vibration generated by the exciter 4 on the basis of an inputted sweep signal and picked up during a vehicle stop, the driver would have difficulty in distinguishing or recognizing the former alarm vibration by feeling it. The difference in signal level (signal level amount) corresponding to the above twice or more amplitude difference between the vibrations corresponds to, for example, a signal level by 6 dB or more. On the basis of this determination, it can be determined that if the signal level of the alarm vibration generated on the basis of the inputted sweep signal and being masked during the vehicle travel (the signal level of the vehicle-travel-time frequency characteristics) is higher than the signal level of the alarm vibration generated on the basis of the inputted sweep signal during the vehicle stop (the signal level of the vehicle-stop-time frequency characteristics) by, for example, 6 dB or more, the driver would have difficulty in recognizing or distinguishing the former alarm vibration.

For this reason, the frequency analyzer 6 according to the present embodiment determines that if the signal level of the vehicle-travel-time frequency characteristics is higher than the signal level of the vehicle-stop-time frequency characteristics by 6 dB or more, the alarm vibration is being masked in the frequency range in which the frequency of the sweep signal is changed. The frequency range here is 40 Hz to 120 Hz. Note that 6 dB is an example of a threshold (criterion) for determining whether masking is occurring. Any value may be set as the threshold as long as the value is equal to or greater than the signal level difference at which the driver has difficulty in feeling an alarm vibration. The threshold may be changed appropriately in accordance with the internal structure of the vehicle, the structure of the driver's seat, the traveling road conditions, the sound-proof and vibration-proof performance of the vehicle, or the like. A threshold having some margin may be set.

In the present embodiment, the signal level of the vehicle-stop-time frequency characteristics for determining whether the signal level difference is 6 dB or more is obtained by reading the previously measured vehicle-stop-time frequency characteristics from the storage unit 11. Note that the signal level of the vehicle-stop-time frequency characteristics need not be stored in the storage unit 11 in advance. For example, the signal level of vehicle-stop-time frequency characteristics may be calculated each time the vehicle stops, by picking up a vibration and noise using the microphone 5 in the vehicle interior.

Figure 4A:
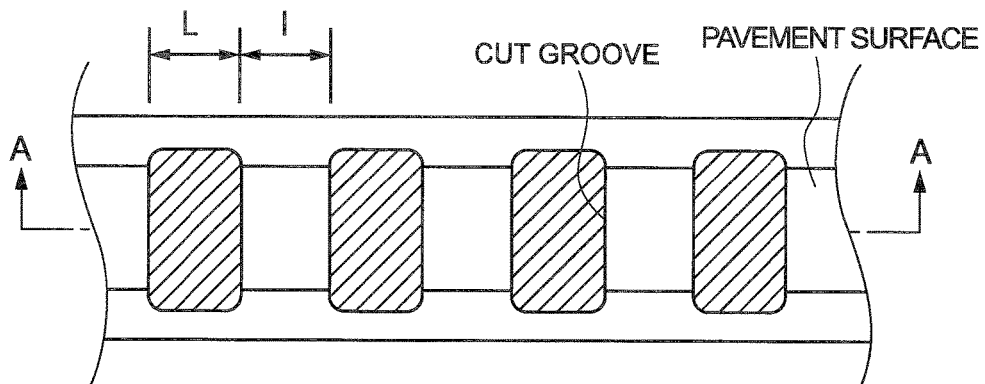
FIG. 4(a) is a plan view showing the configuration of rumble strips.
Figure 4B:
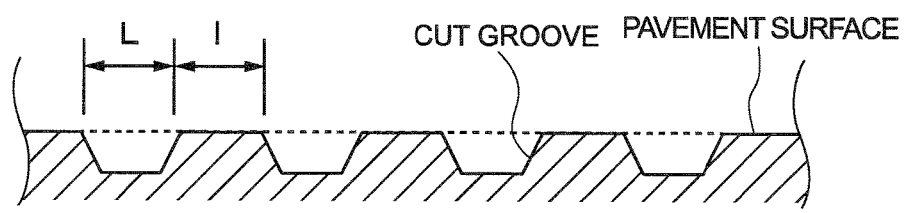
FIG. 4(b) is a sectional view of line A-A of a sight from the arrow direction shown in FIG. 4(a)
Figure 4C:
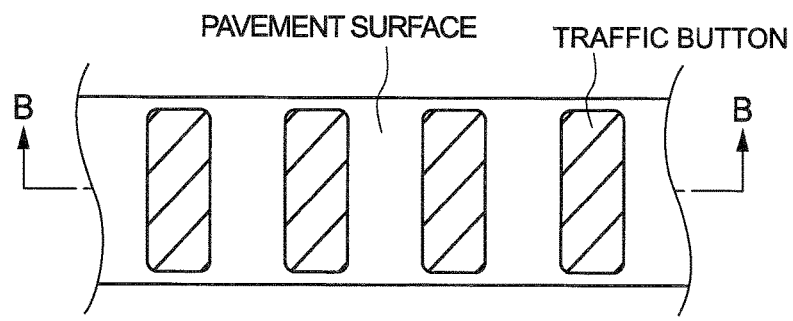
FIG. 4(c) is a plan view showing the configuration of jiggle bars.
Figure 4D:
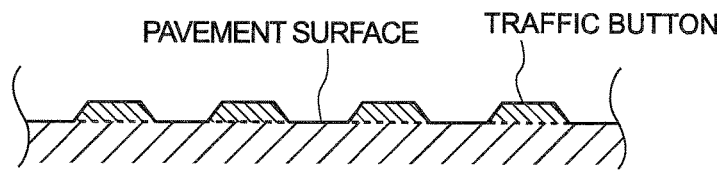
FIG. 4(d) is a sectional view of line B-B of a sight from the arrow direction shown in FIG. 4(c).
Figure 5A:
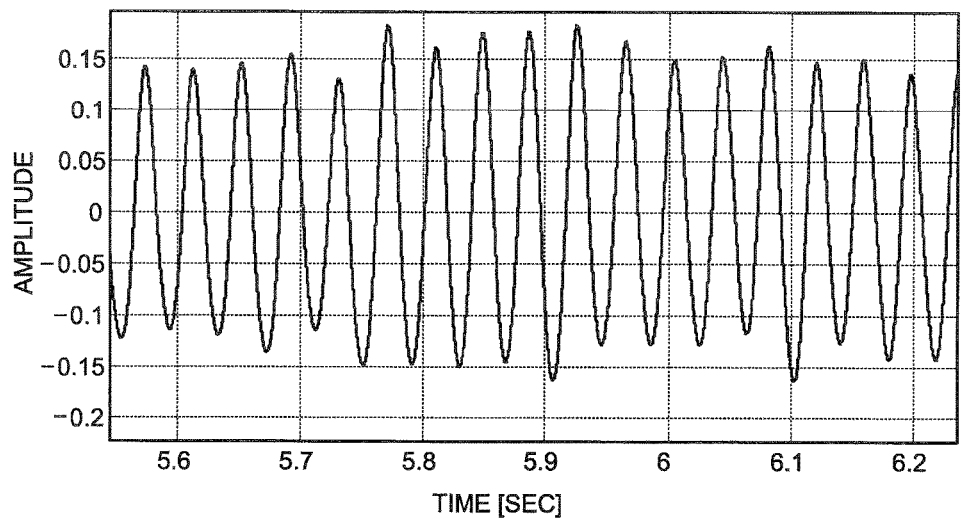
FIG. 5(a) is a graph showing amplitude characteristics in the vehicle interior picked up when traveling at 30 km/h over rumble strips.
Figure 5B:
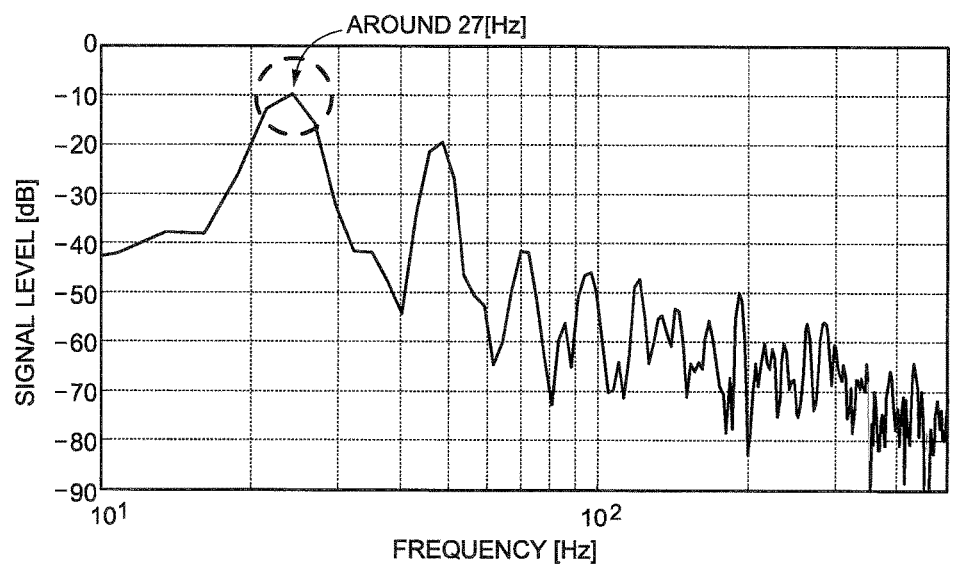
FIG. 5(b) is a graph showing frequency characteristics.

FIGS. 5(a) and 5(b) are graphs showing an example of amplitude characteristics and frequency characteristics of vibrations and noise picked up in the vehicle interior when traveling at 30 km/h over rumble strips. Rumble strips are also called "cut alerting pavement." As shown in FIGS. 4(a) and 4(b), a wavy surface is intentionally formed by forming recessed cut grooves on the pavement surface at predetermined intervals. When a vehicle passes over this wavy surface, sounds and vibrations are generated to alert the driver for lane departure or the like. Also, as shown in FIGS. 4(c) and 4(d), jiggle bars consisting of large, elongated traffic buttons (those provided with reflection plates are called "cat's-eye") are installed on the pavement surface in order to reduce the speed or prevent departure from the lane. As with rumble strips, when a vehicle passes over the jiggle bars, sounds and vibrations are generated.

As described above, rumble strips aim to alert the driver during vehicle travel by generating sounds and vibrations. For this reason, if frequency characteristics in the vehicle interior are measured when traveling over rumble strips, the signal level would be increased at some frequencies, causing masking. As seen above, frequency characteristics in the vehicle interior when traveling over rumble strips are the most appropriate example of vehicle-travel-time frequency characteristics when masking occurs.

As shown in FIGS. 4(a) and 4(b), recessed cut grooves are formed as rumble strips on the road surface at predetermined intervals. For this reason, the frequency characteristics form a peak at a particular frequency, and the peak includes harmonic components. The frequency at which the peak is formed can be analyzed on the basis of the speed of the vehicle traveling over rumble strips, the intervals between the recessed cut grooves, or the like. The intervals between the cut grooves serving as rumble strips shown in FIGS. 4(a) and 4(b) are represented by I, and the widths of the cut grooves themselves are represented by L.

In the present embodiment, it is assumed that the interval I is 150 mm; the width L is 150 mm; and the pitch between cut grooves serving as rumble strips (the distance from an edge of one cut groove to the corresponding edge of an adjacent cut groove) L+I is 300 mm. The cut grooves are formed at predetermined intervals. Assuming that the vehicle travels, for example, at 30 km/h, the time required to travel 300 mm is calculated as follow:

$$30 \text{ km/h}=8.333 \text{ m/s}$$

$$(300 \text{ mm}/1000)/8.333 \text{ m/s}=0.036 \text{ sec}$$

That is, the time required to travel 300 mm is 0.036 sec. Accordingly, a peak of the vehicle-travel-time frequency characteristics is formed at a frequency of 1/0.036 sec=27.7778 Hz. Frequency characteristics shown in FIG. 5(b) show a signal level peak at the frequency around 27 Hz obtained by the above formulas. The frequency characteristics also show other peaks based on harmonic signals at frequencies which are integral multiples of 27 Hz.

By picking up noise and vibrations using the microphone 5 during vehicle travel in this manner, it is possible to analyze characteristics of vibrations that may occur when traveling over an uneven surface on which rumble strips or the like are formed. Thus, it is possible to measure not only rumble strips or jiggle bars but also various road conditions.

Figure 6:
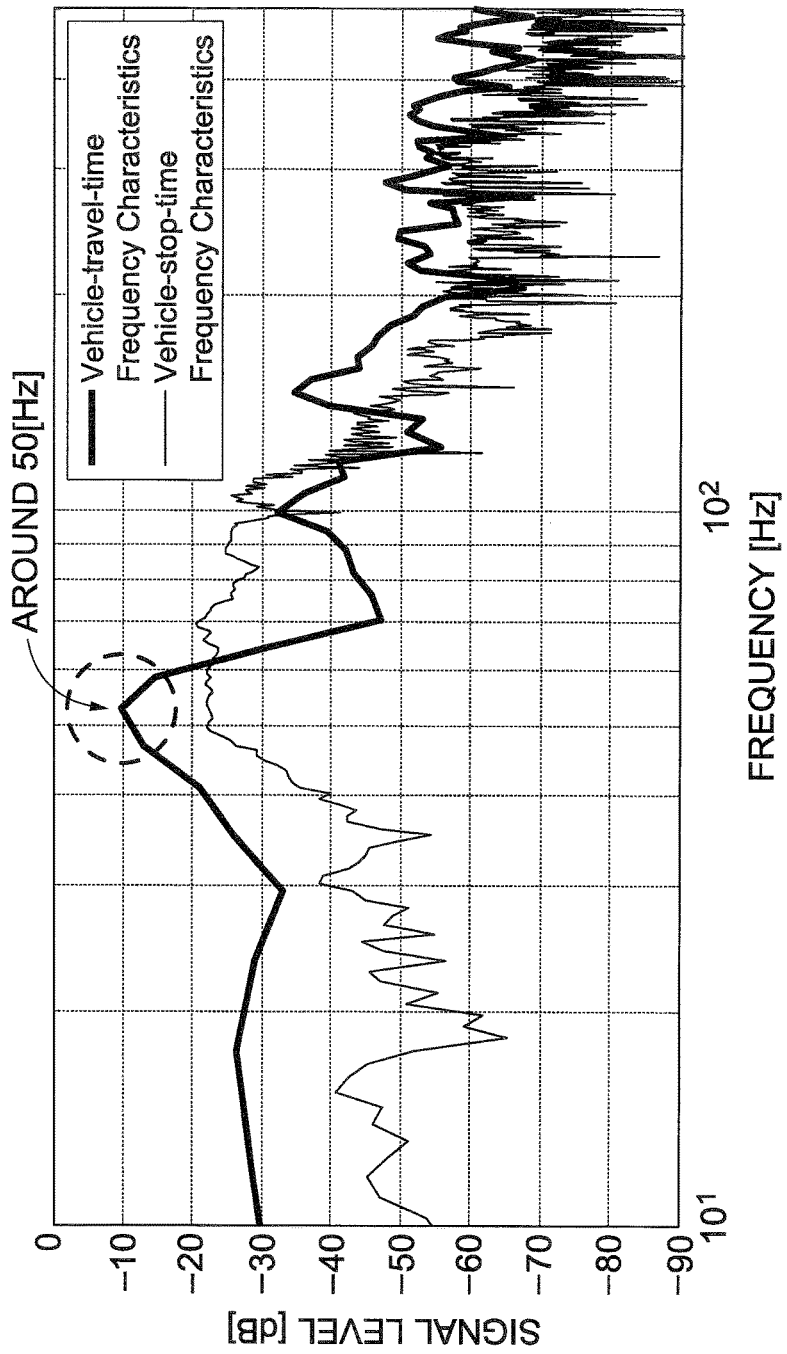
FIG. 6 is a graph showing both one example of frequency characteristics in the vehicle interior picked up when traveling at 50 km/h over rumble strips and the frequency characteristics shown in FIG. 3.
Figure 7:
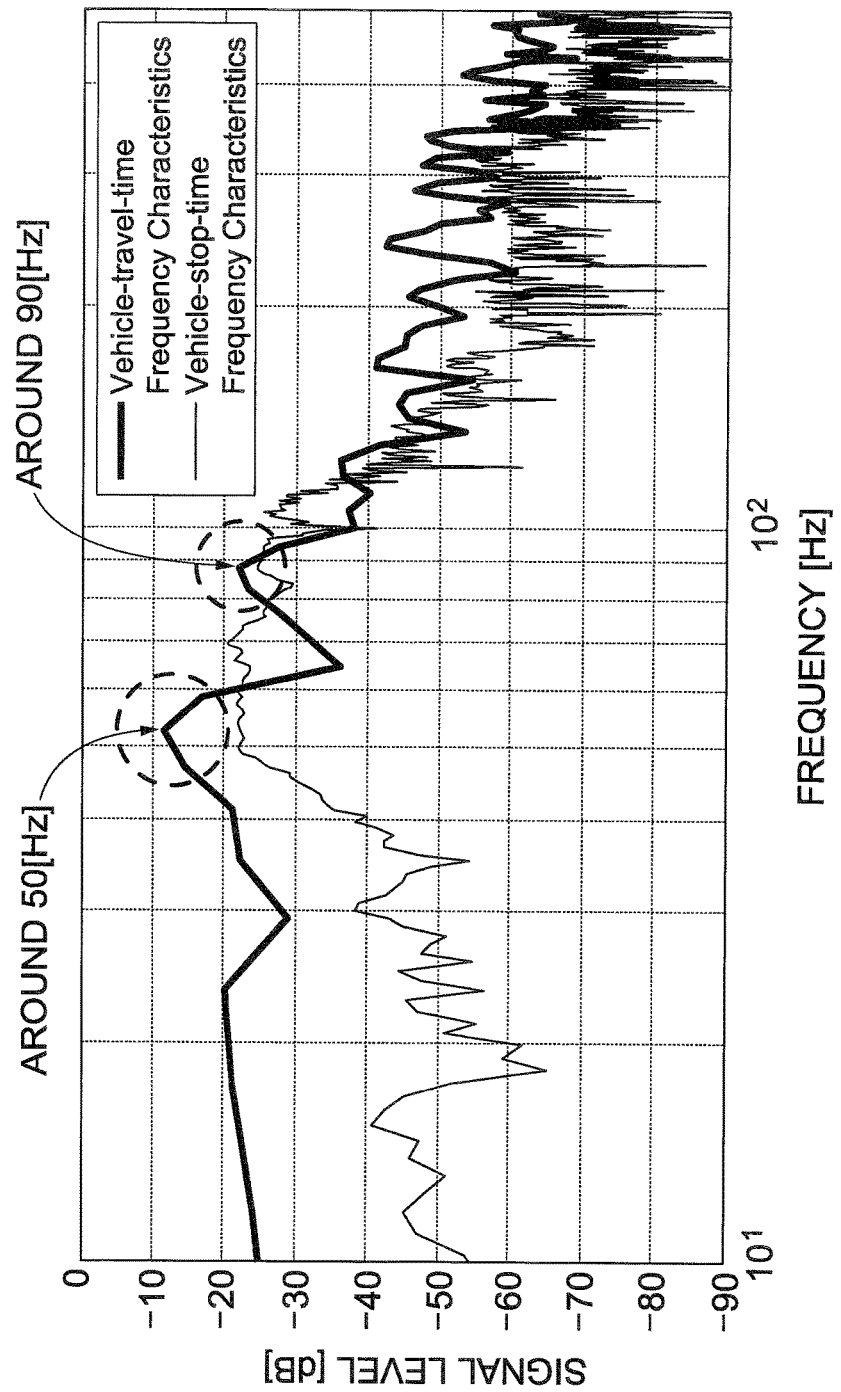
FIG. 7 is a graph showing both another example of frequency characteristics in the vehicle interior picked up when traveling at 50 km/h over rumble strips and the frequency characteristics shown in FIG. 3.

FIGS. 6 and 7 are graphs showing frequency characteristics in the vehicle interior when traveling at 50 km/h over rumble strips while inputting a sweep signal obtained by changing the frequency in a frequency range of 40 Hz to 120 Hz, to the exciter 4. FIGS. 6 and 7 show vehicle-travel-time frequency characteristics measured in different time zones.

FIGS. 6 and 7 also show vehicle-stop-time frequency characteristics (frequency characteristics shown in FIG. 3). As described above, it can be determined that if the signal level difference (the difference between the signal level amounts) obtained by subtracting the vehicle-stop-time frequency characteristics from the vehicle-travel-time frequency characteristics is 6 dB or more, the level of the sweep signal is being masked by traveling noise and traveling vibrations. FIG. 6 reveals that the difference in signal level between the vehicle-stop-time frequency characteristics and the vehicle-travel-time frequency characteristics is 6 dB or more around 50 Hz. For this reason, it can be determined that the level of the sweep signal is being masked by noise in a range around 50 Hz during vehicle travel.

As with the frequency characteristics shown in FIG. 6, vehicle-travel-time frequency characteristics shown in FIG. 7 show a signal level peak around 50 Hz. On the other hand, unlike in FIG. 6, the frequency characteristics shown in FIG. 7 also show a peak around 90 Hz. However, the difference in signal level between the vehicle-stop-time frequency characteristics and the vehicle-travel-time frequency characteristics around 90 Hz is less than 6 dB. It can be determined that the reason for such a small signal level difference (less than 6 dB) is that a sweep signal is being outputted around 90 Hz rather than that masking is being caused by noise during vehicle travel.

As shown in FIGS. 6 and 7, in the frequency characteristics in the vehicle interior when traveling at 50 km/h over rumble strips, a peak of the signal level is formed around about 50 Hz, and another peak is formed by a harmonic component of that frequency.

In frequency characteristics in the vehicle interior when traveling at 50 km/h over rumble strips where the interval I and width L shown in FIGS. 4(a) and 4(b) are 150 mm and 150 mm, respectively (the pitch I+L is 300 mm), the frequency at which the signal level peaks is calculated as follows.

50 km/h=13.8889 m/s (300 mm/1000)/13.8889 m/s=0.0216 sec

That is, the frequency at which the signal level peaks can be calculated as 1/0.0216 sec=46.2963 Hz, that is, about 46 Hz.

There is an error between the peak frequency (about 50 Hz) obtained in FIGS. 6 and 7 and the peak frequency (about 46 Hz) obtained by the above calculation. The reason is that the travel speed of the vehicle measured when picking up noise and vibrations using the microphone 5 may include an error.

As shown in FIGS. 6 and 7, the frequency characteristics when traveling at 50 km/h over rumble strips show that masking occurs around 50 Hz. For this reason, the frequency analyzer 6 makes a margin of ±10 Hz with respect to 50 Hz and determines that masking occurs in a frequency range of 40 Hz to 60 Hz. The frequency analyzer 6 then outputs the frequency range of 40 Hz to 60 Hz to the frequency variable unit 7 as masking region information.

On the other hand, if the frequency analyzer 6 does not detect a frequency at which the difference in signal level between the vehicle-travel-time frequency characteristics and the vehicle-stop-time frequency characteristics is 6 dB or more, it outputs masking region information indicating that "there is no frequency at which masking occurs", to the frequency variable unit 7.

[Frequency Variable Unit]

The frequency variable unit 7 has a function of designing a filter to be applied to a sweep signal on the basis of the masking region information received from the frequency analyzer 6. For example, if a frequency range in which masking occurs is detected in the vehicle-travel-time frequency characteristics, the driver may not become aware of an alarm vibration generated by the exciter 4 on the basis of a sweep signal in this frequency range, due to masking. For this reason, the frequency variable unit 7 designs a filter for generating a sweep signal whose signal level is limited (suppressed) in the frequency range in which masking occurs (a sweep signal that is outputted with only the signal level of a frequency range in which masking does not occur; second sweep signal).

For example, if the masking region information received from the frequency analyzer 6 indicates 40 Hz to 60 Hz, as shown in FIGS. 6 and 7, the frequency variable unit 7 designs a band-pass filter for a frequency range of 60 Hz to 120 Hz, which does not correspond to the masking region information, to be applied to a sweep signal whose frequency is changed in a frequency range of 40 Hz to 120 Hz.

Figure 8A:
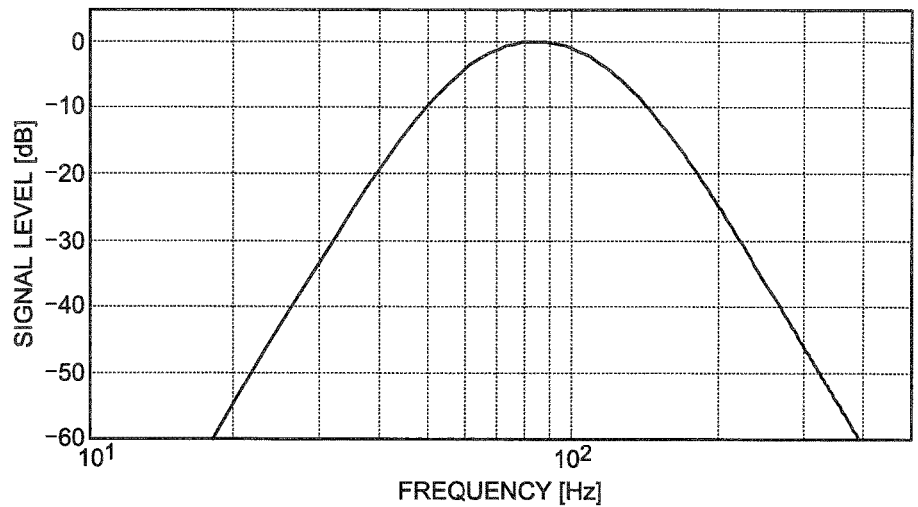
FIG. 8(a) is a graph showing properties of a band-pass filter for 60 Hz to 120 Hz.
Figure 8B:
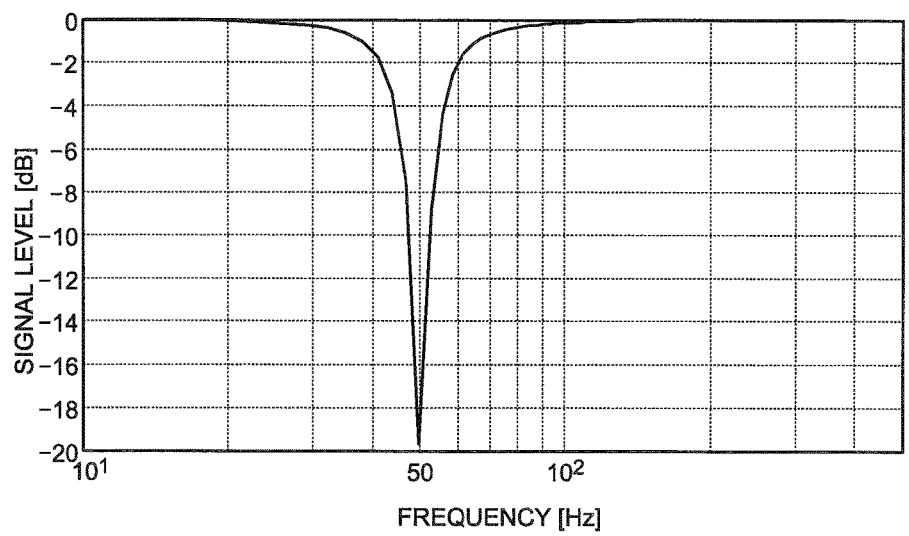
FIG. 8(b) is a graph showing properties of a peaking filter for limiting the signal level output at 50 Hz.

FIG. 8(*a*) shows an example of characteristics of the band-pass filter for 60 Hz to 120 Hz. The band-pass filter shown in FIG. 8(*a*) is designed as a filter in which a three-stage, sixth-order low-pass filter having a cutoff frequency of 120 Hz and a three-stage, sixth-order high-pass filter having a cutoff frequency of 60 Hz are combined.

The band-pass filter thus designed is applied to a sweep signal generated by the signal generator 3 (a sweep signal obtained by changing the frequency of a sine wave in a frequency range of 40 Hz to 120 Hz; first sweep signal). Due to this filtering process, a frequency range of the sweep signal to output signal levels is limited to 60 Hz to 120 Hz. By inputting the sweep signal whose frequency range is limited to 60 Hz to 120 Hz (second sweep signal) to the exciter 4, it is possible to prevent output of an alarm vibration in the frequency range in which masking may occur. Thus, an alarm vibration in the frequency range in which masking does not occur can be reliably generated by the exciter 4.

Instead of designing a band-pass filter as shown in FIG. 8(*a*), the frequency variable unit 7 may design a peaking filter that limits the signal level at 50 Hz as shown in FIG. 8(*b*). By applying such a peaking filter to a sweep signal, the signal level around 50 Hz where masking occurs can be suppressed. Thus, an alarm vibration having frequencies at which masking does not occur can be reliably generated by the exciter 4.

Figure 9A:
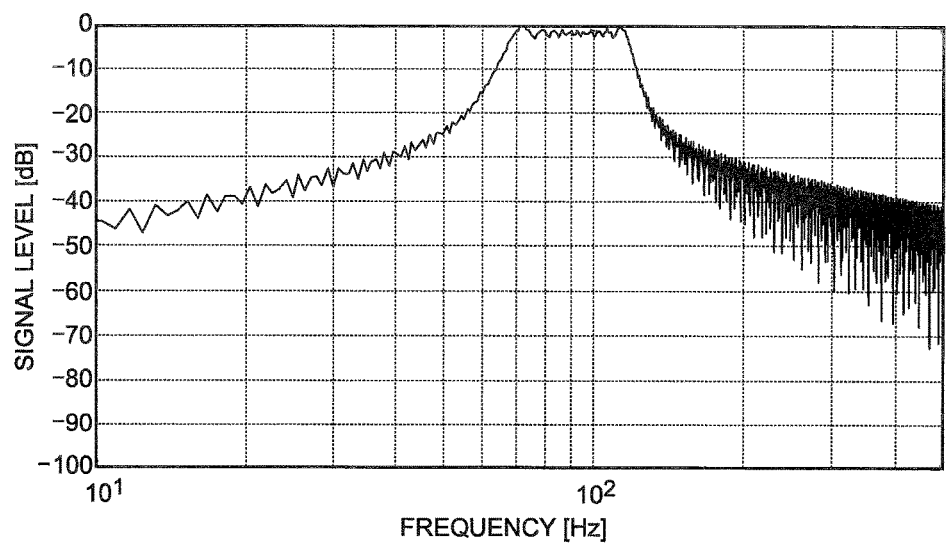
FIG. 9(a) is a graph showing frequency characteristics of a signal obtained by applying a band-pass filter for 65 Hz to 120 Hz to a sweep signal obtained by changing the frequency in a frequency range of 40 Hz to 120 Hz.
Figure 9B:
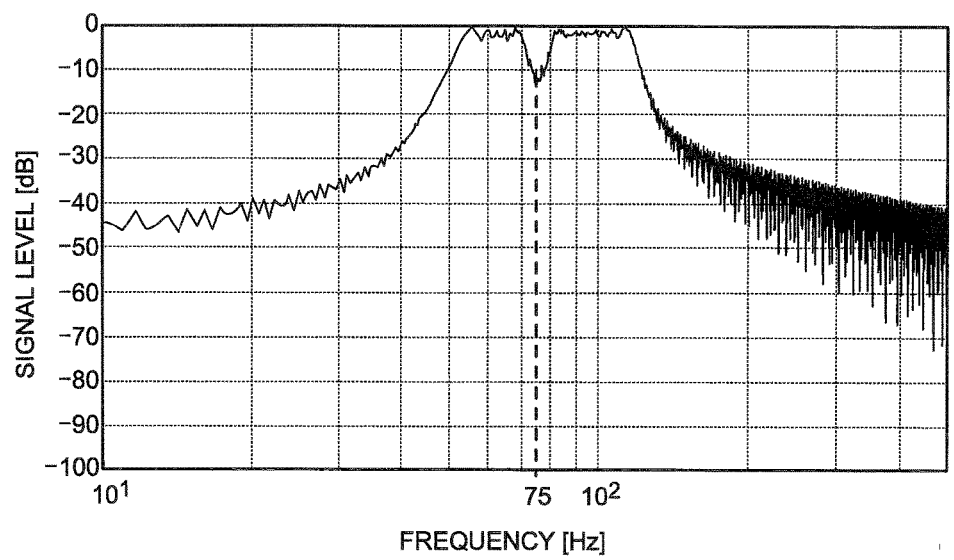
FIG. 9(b) is a graph showing frequency characteristics of a signal obtained by applying a peaking filter having a center frequency of 75 Hz to a sweep signal obtained by changing the frequency in a frequency range of 40 Hz to 120 Hz.

FIG. 9(*a*) is a graph showing frequency characteristics of a signal (filtered sweep signal; second sweep signal) generated by applying a band-pass filter for 65 Hz to 120 Hz designed by the frequency variable unit 7 to a sweep signal obtained by changing the frequency in a frequency range of 40 Hz to 120 Hz. If the masking region information indicates 40 Hz to 60 Hz as described above, a frequency (start frequency) adjacent to the frequency range in which masking occurs, of a sweep signal may be set to 65 Hz by making a margin of 5 Hz.

Figure 10:
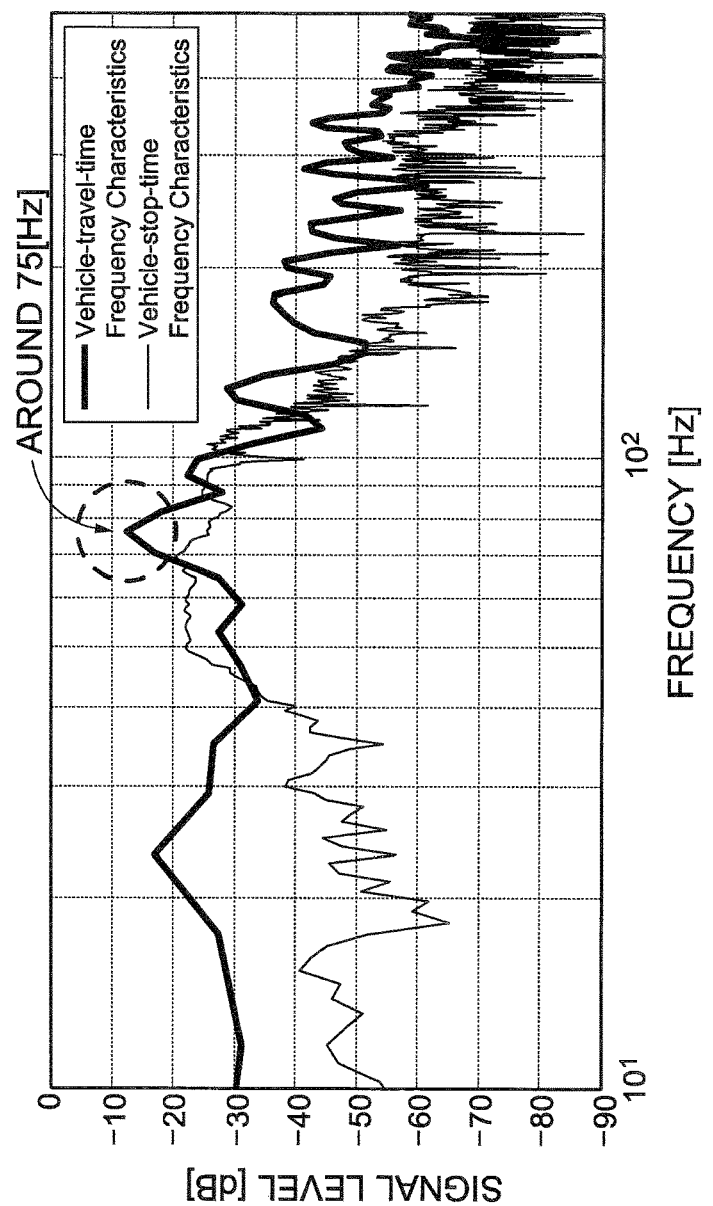
FIG. 10 is a graph showing an example of vehicle-travel-time frequency characteristics in the vehicle interior and vehicle-stop-time frequency characteristics in the vehicle interior.

While FIGS. 6 and 7 show cases where the frequency range in which masking occurs is a frequency range of 40 Hz to 60 Hz, the frequency range in which masking occurs need not necessarily be a lower range in the frequency range in which the frequency of a sweep signal is changed and may be a higher range. For example, FIG. 10 is a graph showing vehicle-travel-time frequency characteristics and vehicle-stop-time frequency characteristics. FIG. 10 shows a case in which the frequency at which the difference in signal level between the vehicle-travel-time frequency characteristics and the vehicle-stop-time frequency characteristics is 6 dB or more is in a frequency range of 75 Hz to 85 Hz (a peak during vehicle travel is around 75 Hz).

If the frequency range of 75 Hz to 85 Hz is the frequency range in which masking occurs, the frequency analyzer 6 outputs the frequency range of 75 Hz to 85 Hz to the frequency variable unit 7 as masking region information. The frequency variable unit 7 designs a peaking filter for suppressing the signal level at 75 Hz to 85 Hz, to be applied to a sweep signal whose frequency is changed in the frequency range of 40 Hz to 120 Hz on the basis of the masking region information received from the frequency analyzer 6. FIG. 9(*b*) shows frequency characteristics of a signal (filtered sweep signal; second sweep signal) obtained by applying a peaking filter having a center frequency of 75 Hz to a sweep signal.

As described above, the frequency variable unit 7 designs a filter on the basis of masking region information received from the frequency analyzer 6 and filters a sweep signal outputted from the signal generator 3. Thus, the signal level in the frequency range in which masking makes it difficult to produce an alarm vibration recognition effect is suppressed (reduced). By suppressing the signal level in the frequency range in which masking occurs, the output of the power amplifier can be reduced, resulting in power savings. The frequency variable unit 7 then outputs the filtered sweep signal (second sweep signal) to the correction processor 8.

On the other hand, if the masking region information received from the frequency analyzer 6 is information indicating "there is no frequency at which masking occurs," the frequency variable unit 7 does not design a filter or filter a sweep signal. The frequency variable unit 7 then outputs the sweep signal received from the signal generator 3 to the correction processor 8 as it is (outputs the received first sweep signal as a second sweep signal).

[Correction Processor]

The correction processor 8 has a function of providing the sweep signal (second sweep signal) received from the frequency variable unit 7 with amplitude characteristics similar to those obtained when traveling over rumble strips.

Figure 11:
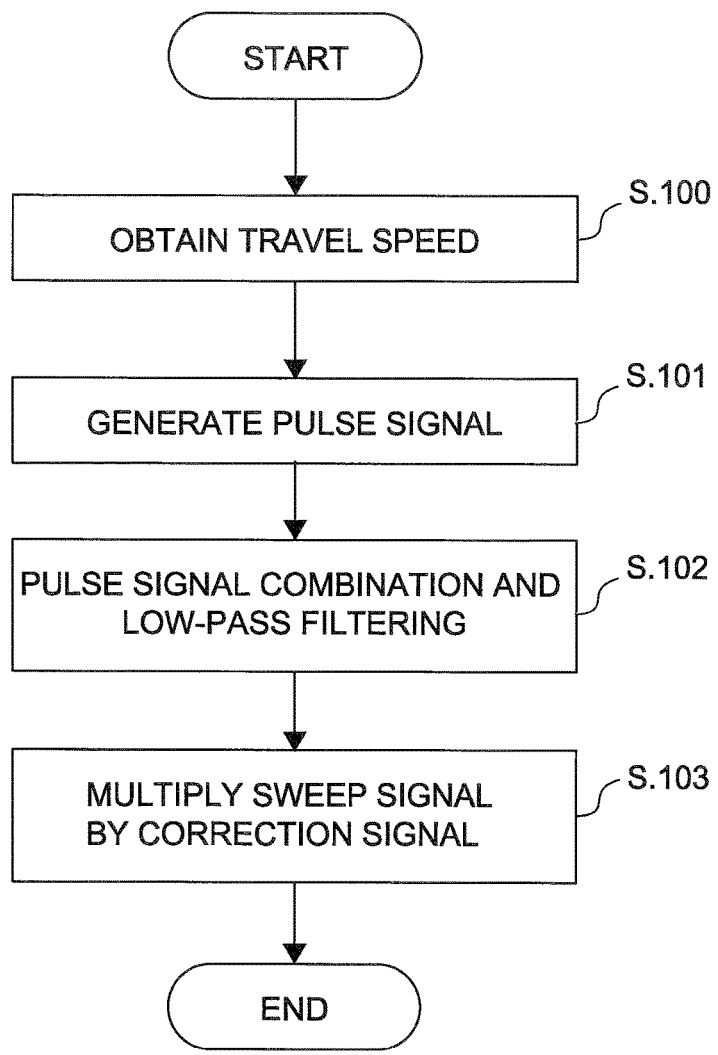
FIG. 11 is a flowchart showing a process performed by a correction processor according to the embodiment.

FIG. 11 is a flowchart showing a process performed by the correction processor 8. The correction processor 8 determines (obtains) the travel speed by acquiring a vehicle speed signal indicating the vehicle speed during travel from the vehicle body (S.100). The correction processor 8 then generates a pulse signal corresponding to a vibration that occurs when traveling over rumble strips, on the basis of the travel speed (S.101).

Figure 12A:
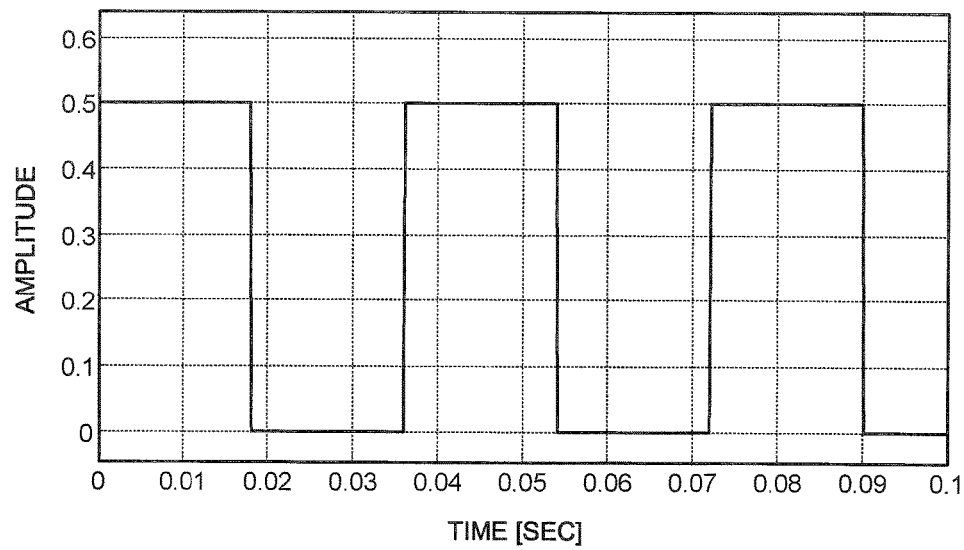
FIG. 12(a) is a graph showing amplitude characteristics of a pulse signal when assuming that the vehicle travels at 30 km/h over rumble strips where the pitch is 300 mm.
Figure 12B:
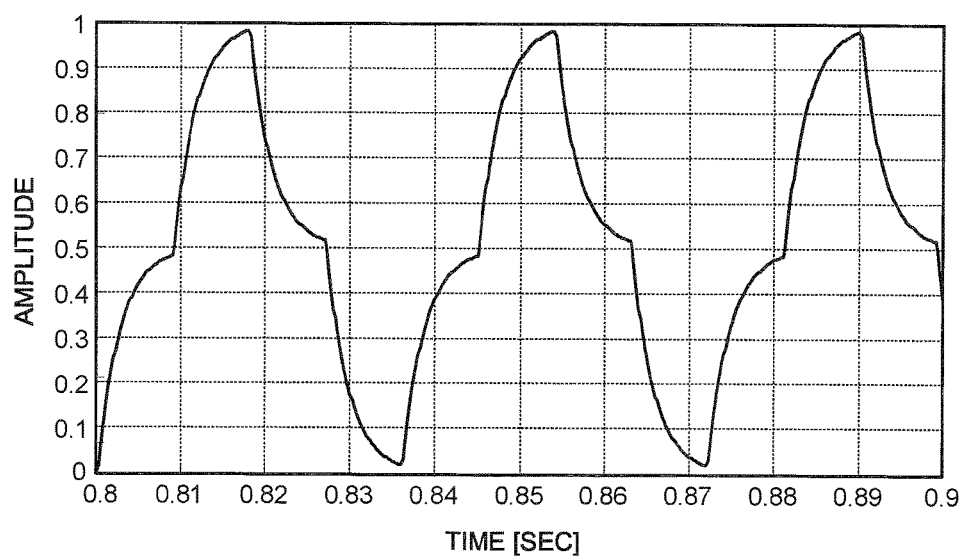
FIG. 12(b) is a graph showing amplitude characteristics of a correction signal obtained by preparing two pulse signals, each being the pulse signal shown in FIG. 12(a), making a phase difference therebetween, combining the resulting signals, and low-pass filtering the resulting signal.

The rumble strips shown in FIGS. 4(*a*) and 4(*b*) are cut grooves formed at predetermined intervals. For this reason, the correction processor 8 generates a pulse signal corresponding to a vibration that occurs when traveling over the rumble strips and multiplies the sweep signal received from the frequency variable unit 7 by a correction signal generated on the basis of the pulse signal. Thus, the sweep signal can be provided with a vibration pattern similar to that obtained when traveling over the rumble strips FIG. 12(*a*) is a graph showing amplitude characteristics of a pulse signal when assuming that the vehicle travels at 30 km/h over rumble strips where the pitch is 300 mm (the interval I and the width L shown in FIGS. 4(*a*) and 4(*b*) is 150 mm and 150 mm, respectively, and the pitch I+L is 300 mm). As described above, it takes 0.036 sec to travel 300 mm, which is the pitch, at 30 km/h. As shown in FIG. 12(*a*), the time of one cycle of the pulse signal is also 0.036 sec.

When the vehicle actually travels over rumble strips, the two wheels, the front wheel and the rear wheel, pass over the rumble strips. Accordingly, a pulse signal obtained by combining two pulse waveforms having a phase difference becomes a vibration that is inputted and transmitted to the vehicle when traveling over the rumble strips. Also, when the vehicle actually travels over the rumble strips, a vibration inputted and transmitted to the vehicle becomes a pulse waveform that has become a smooth vibration change due to the effect of suspensions or the like.

For this reason, the correction processor 8 prepares two pulse signals, each being the pulse signal shown in FIG. 12(*a*), for the front and rear wheels, makes a phase difference between the pulse signals, combines the resulting pulse signals, and then smooths the change state of amplitude of the resulting pulse signal consisting of 0 and 1 by low-pass filtering the pulse signal (S.102). FIG. 12(*b*) is a graph showing amplitude characteristics of the signal obtained when the correction processor 8 combines the two pulse signals and low-pass filters the resulting pulse signal. As shown in FIG. 12(*b*), by combining the two pulse signals and low-pass filtering the resulting pulse signal, the correction processor 8 can reduce small amplitude variations and fluctuations that may occur when multiplying the sweep signal received from the frequency variable unit 7 by the correction signal (to be discussed later), as well as can prevent unusual noise.

Figure 13A:
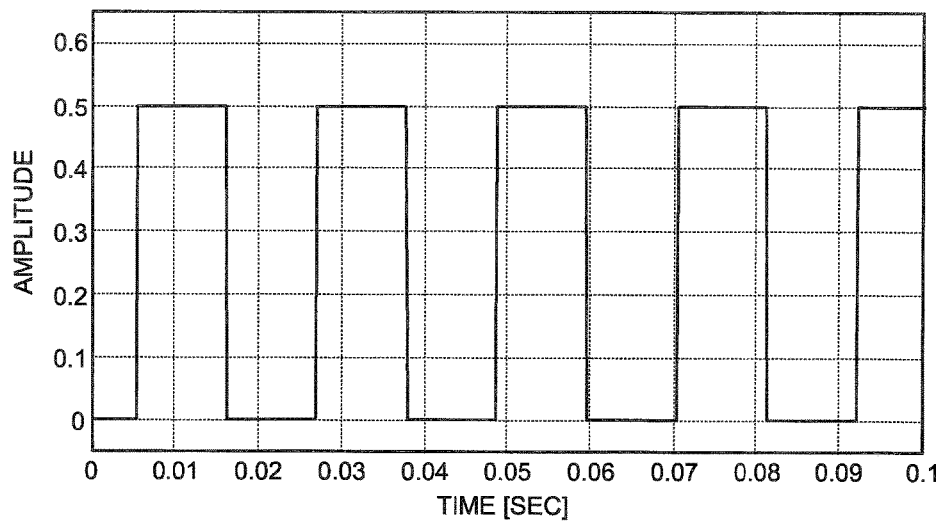
FIG. 13(a) is a graph showing amplitude characteristics of a pulse signal when assuming that the vehicle travels at 50 km/h over rumble strips where the pitch is 300 mm.
Figure 13B:
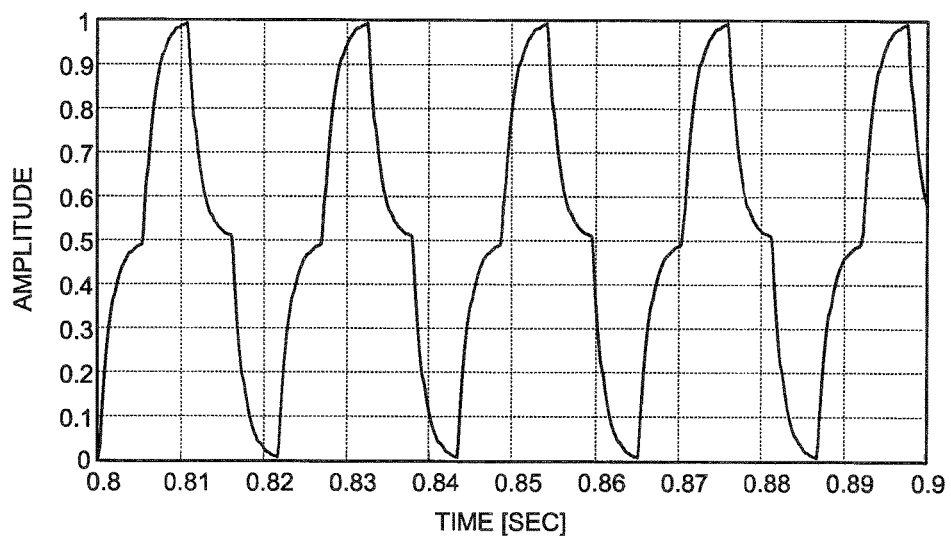
FIG. 13(b) is a graph showing amplitude characteristics of a correction signal obtained by preparing two pulse signals, each being the pulse signal shown in FIG. 13(a), making a phase difference therebetween, combining the resulting signals, and low-pass filtering the resulting signal.

FIG. 13(*a*) shows a pulse signal when assuming that the vehicle travels at 50 km/h over rumble strips where the pitch is 300 mm. FIG. 13(*b*) shows amplitude characteristics of a signal obtained when the correction processor 8 prepares two pulse signals, each being the pulse signal shown in FIG. 13(*a*), makes a phase difference therebetween, combines the resulting pulse signals, and smooths the change state of amplitude of the resulting pulse signal by low-pass filtering the pulse signal. A comparison between FIGS. 12(*a*) and 12(*b*) and FIGS. 13(*a*) and 13(*b*) reveals that as the vehicle speed (S.100) acquired using the vehicle signal is increased, the time of one cycle of the pulse signal and the time of one cycle of the low-pass filtered signal ("correction signal") are reduced. Thus, it is possible to generate a correction signal having amplitude characteristics that are changed in accordance with the vehicle speed when traveling over rumble strips.

The correction processor 8 then provides amplitude changes that may occur when traveling over rumble strips, to the sweep signal received from the frequency variable unit 7 by multiplying the sweep signal by the correction signal (S.103). As used herein, the term "correction signal" refers to a signal obtained by combining two pulse signals and low-pass filtering the resulting pulse signal.

Figure 14A:
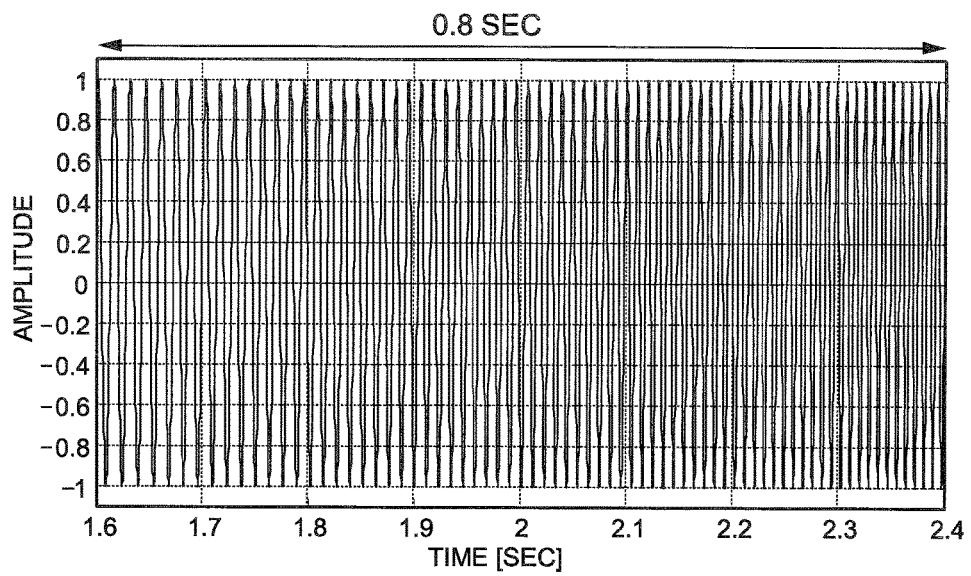
FIG. 14(a) is a graph showing amplitude characteristics of the sweep signal shown in FIG. 9(a)
Figure 14B:
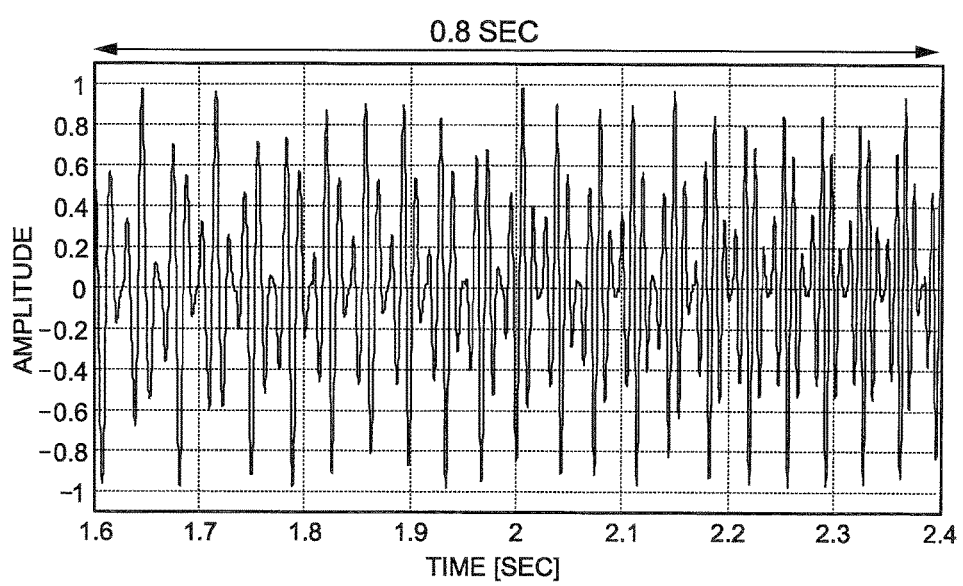
FIG. 14(b) is a graph showing amplitude characteristics of a signal obtained by multiplying the sweep signal shown in FIG. 14(a) by the correction signal shown in FIG. 12(b).

FIG. 14(*a*) shows amplitude characteristics of the sweep signal whose frequency is changed in the frequency range of 65 Hz to 120 Hz shown in FIG. 9(*a*). FIG. 14(*b*) shows amplitude characteristics of a signal obtained by multiplying the sweep signal shown in FIG. 14(*a*) by the correction signal generated assuming that the vehicle travels at 30 km/h, shown in FIG. 12(*b*). By multiplying the sweep signal having a constant amplitude shown in FIG. 14(*a*) by the correction signal shown in FIG. 12(*b*), amplitude characteristics similar to those of a vibration that occurs when actually traveling over rumble strips can be provided to the sweep signal (second sweep signal), as shown in FIG. 14(*b*). When the correction processor 8 inputs, to the exciter 4, the sweep signal (second sweep signal) having the amplitude characteristics similar to those when traveling over rumble strips, only the driver sitting on the driver's seat is allowed to feel an alarm vibration having amplitude characteristics similar to those when traveling over rumble strips.

Figure 15:
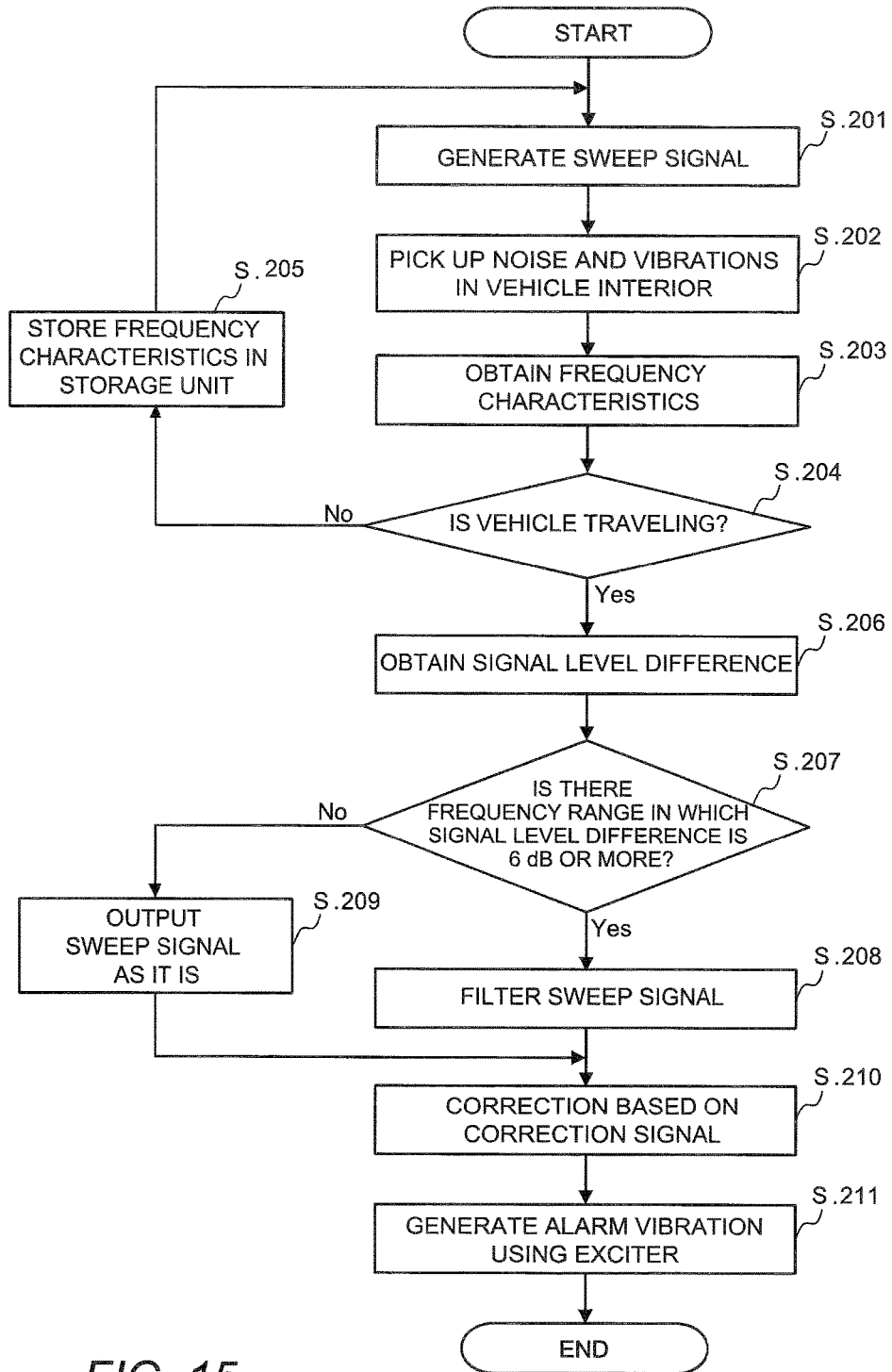
FIG. 15 is a flowchart briefly showing steps performed by the elements of the vehicle alarm device according to the embodiment.

FIG. 15 is a flowchart briefly showing steps performed by the elements (signal generator 3, frequency analyzer 6, frequency variable unit 7, and correction processor 8) of the vehicle alarm device 1. As described above, in the vehicle alarm device 1, first, the signal generator 3 generates a sweep signal (first sweep signal) and inputs it to the exciter 4 (S.201: signal generation step). Then, the microphone 5 picks up sounds, vibrations, and the like in the vehicle interior, including an alarm vibration generated by the exciter 4 (S.202: measurement step), and the frequency analyzer 6 obtains frequency characteristics of the picked-up sounds and vibrations (S.203: frequency analysis step). If the obtained frequency characteristics are vehicle-stop-time frequency characteristics (No in S.204), the frequency analyzer 6 stores the obtained frequency characteristics in the storage unit 11 (S.205).

On the other hand, if the obtained frequency characteristics are vehicle-travel-time frequency characteristics (Yes in S.204), the frequency analyzer 6 obtains the difference in signal level between the vehicle-travel-time frequency characteristics and the vehicle-stop-time frequency characteristics (S.206: frequency analysis step) and determines whether there is a frequency range in which the level difference is 6 dB or more (S.207: frequency analysis step). If there is a frequency range in which the level difference is 6 dB or more (Yes in S.207), the frequency variable unit 7 generates a filter that limits the signal level in this frequency range, applies the filter to the sweep signal (S.208: frequency variable step), and outputs the resulting signal (second sweep signal) to the correction processor 8. On the other hand, if there is no frequency range in which the level difference is 6 dB or more (No in S.207), the frequency variable unit 7 outputs the sweep signal to the correction processor 8 as it is (outputs the first sweep signal as a second sweep signal) without filtering the sweep signal (S.209).

The correction processor 8 corrects the signal (second sweep signal) received from the frequency variable unit 7 by multiplying the signal by the correction signal having amplitude characteristics based on rumble strips (S.210: correction step) and outputs the corrected sweep signal (corrected second sweep signal) to the exciter 4 so that an alarm vibration is generated by the exciter 4 (S.211: notification vibration generation step).

As seen above, the vehicle alarm device 1 determines whether the sweep signal is being masked, on the basis of the difference in signal level between the vehicle-travel-time frequency characteristics and the vehicle-stop-time frequency characteristics. If masking is occurring, the vehicle alarm device 1 filters the sweep signal to limit the signal level in the frequency range in which masking occurs (to avoid the frequency range in which masking occurs). By limiting the signal level in the frequency range in which masking occurs, it is possible to avoid the output of a signal at frequencies at which the recognizability or distinguishability of the driver is reduced due to masking. Also, the output of the power amplifier can be reduced, resulting in power savings.

Also, a correction process is performed so that amplitude characteristics of the sweep signal having frequencies except for the frequency range in which masking occurs correspond to amplitude characteristics of noise and vibrations intruded into and transmitted to the vehicle interior when assuming that the vehicle travels over rumble strips. Thus, the exciter 4 can generate an alarm vibration having amplitude characteristics having high recognizability or distinguishability similar to those when traveling over rumble strips.

In particular, an alarm vibration having amplitude characteristics similar to those when traveling over rumble strips is generated on the basis of a sweep signal having frequencies except for the frequency range in which masking occurs. Thus, the driver is allowed to reliably feel the alarm vibration based on the frequency range in which masking does not occur.

Also, an alarm vibration is generated only in the driver's seat in which the exciter 4 is installed. Thus, even if an alarm vibration is generated, a passenger other than the driver is prevented from feeling the alarm vibration. As a result, even if a vibration similar to that when traveling over rumble strips is generated by the exciter 4, the other passenger is prevented from recognizing or distinguishing the vibration and thus prevented from feeling uncomfortable or anxious. On the other hand, the driver feels a vibration similar to that when traveling over rumble strips rather than a monotonous vibration and thus can remarkably and reliably recognize or distinguish the presence or absence of the alarm vibration.

While the vehicle alarm device 1 has been described in detail as an example of the vehicle notification device and vehicle notification method according to the present invention, the vehicle notification device and vehicle notification method according to the present invention are not limited to the example described in the embodiment. Those skilled in the art would apparently conceive of various changes or modifications thereto without departing from the scope of claims, and such changes or modifications can also produce effects similar to those of the example described in the embodiment.

For example, as described above, in the vehicle alarm device 1 according to the embodiment, the signal generator 3 generates a sweep signal by changing the frequency of a sine wave in a frequency range of 40 Hz to 120 Hz, and the frequency variable unit 7 generates a sweep signal which will not be outputted in the frequency range in which masking occurs, by designing a filter for excluding frequencies at which masking occurs and filtering the sweep signal. However, in the vehicle notification device and vehicle notification method according to the embodiment of the present invention, the frequency variable unit 7 need not design a filter for excluding the frequencies at which masking occurs. The frequency variable unit 7 may have any configuration as long as it can output a sweep signal having frequencies except for the frequencies at which masking occurs (a sweep signal whose signal level in the frequencies at which masking occurs is limited), to the correction processor 8.

Figure 16:
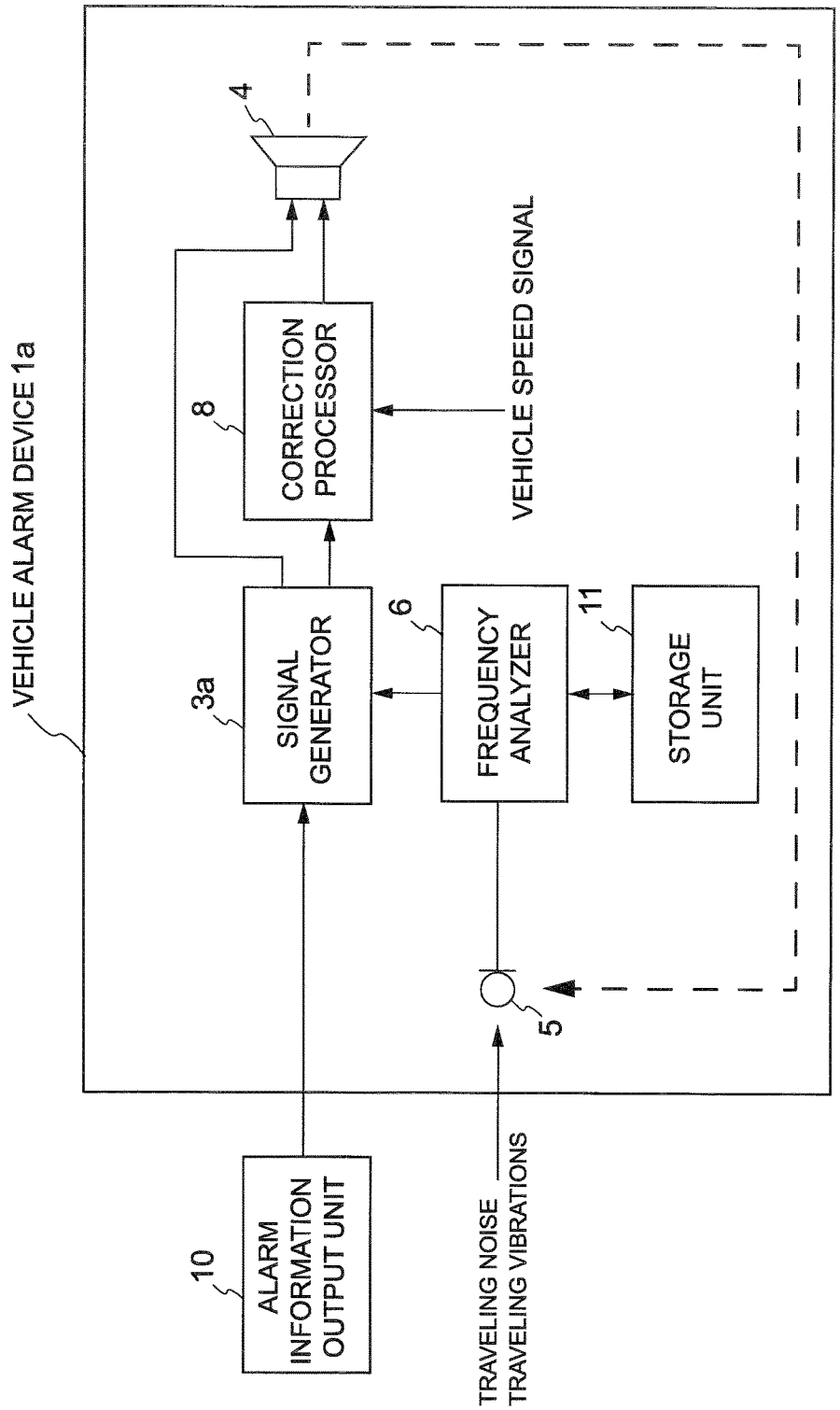
FIG. 16 is a block diagram showing another schematic configuration of the vehicle alarm device according to the embodiment.

For example, as shown in FIG. 16, a signal generator (first signal generator, second signal generator) 3a may be formed by combining the signal generator 3 and frequency variable unit 7 shown in FIG. 1. In a vehicle alarm device 1a shown in FIG. 16, the signal generator 3a is configured to be able to generate multiple sweep signals having different frequency ranges in which the frequency is changed. Thus, during a vehicle stop, the signal generator 3a is able to generate a sweep signal whose frequency is changed in a frequency range of 40 Hz to 120 Hz and to output it to an exciter 4. Also, during vehicle travel, the signal generator 3a is able to generate a sweep signal whose frequency is changed in a frequency range except for frequencies at which masking occurs, on the basis of masking region information received from a frequency analyzer 6 and to output the sweep signal to a correction processor 8. The vehicle alarm device 1a configured as shown in FIG. 16 can also produce effects similar to those of the vehicle alarm device 1 shown in FIG. 1.

The correction signal used by the correction processor 8 in the correction process need not necessarily be a correction signal having vibration characteristics of rumble strips. A correction signal having vibration characteristics different from those of rumble strips may be set as long as the recognizability or distinguishability of an alarm vibration by the driver and the attention of the driver thereto can be increased.

As described above, the vehicle alarm device 1 according to the embodiment generates a correction signal having characteristics of vibrations transmitted to and generated in the vehicle when traveling over rumble strips. In particular, there have been described vibration characteristics in which the amplitude is changed in accordance with the travel speed of the vehicle traveling over rumble strips by adjusting time interval of the vibration on the basis of the vehicle speed acquired from the vehicle speed signal. However, there may be set vibration characteristics in which the amplitude of a correction signal (the amplitude of an alarm vibration that may be generated assuming that the vehicle travels over rumble strips) is constant regardless of the travel speed of the vehicle. Instead of changing time interval of the vibration and amplitude characteristics in accordance with the vehicle speed, an alarm vibration may be outputted using a correction signal having the same time interval of the vibration and amplitude characteristics regardless of the vehicle speed value.

REFERENCE SIGNS LIST

1, 1a vehicle alarm device (vehicle notification device)
3 signal generator
3a signal generator (first signal generator, second signal generator)

4 exciter (vibrator)
5 microphone (measurement unit)
6 frequency analyzer
7 frequency variable unit
8 correction processor
10 alarm information output unit
11 storage unit

The invention claimed is:

1. A vehicle notification device comprising:
a vibrator disposed in a seat in a vehicle interior;
a first signal generator configured to generate a first sweep signal by changing a frequency in a predetermined frequency range;
a measurement unit configured to measure a vibration in the vehicle interior;
a frequency analyzer configured to calculate vehicle-stop-time frequency characteristics and vehicle-travel-time frequency characteristics by measuring a vibration using the measurement unit in the vehicle interior during a vehicle stop and during vehicle travel while inputting the first sweep signal to the vibrator and to detect a frequency range in which a signal level of the vehicle-travel-time frequency characteristics is higher than a signal level of the vehicle-stop-time frequency characteristics by a predetermined level amount or more; and
a second signal generator configured to generate a second sweep signal by changing a frequency in a new frequency range obtained by excluding the frequency range detected by the frequency analyzer from the predetermined frequency range in which the frequency of the first sweep signal is changed, wherein
the vibrator generates a notification vibration on the basis of the second sweep signal generated by the second signal generator.

2. The vehicle notification device according to claim 1, further comprising a correction processor configured to correct the second sweep signal so that an amplitude value of the second sweep signal varies with time, by multiplying the second sweep signal by a correction signal whose amplitude value varies with time, wherein
the vibrator generates the notification vibration on the basis of the second sweep signal corrected by the correction processor.

3. The vehicle notification device according to claim 2, wherein amplitude characteristics of the correction signal are set on the basis of amplitude characteristics of a vibration that occurs in a vehicle when the vehicle passes over rumble strips.

4. A vehicle notification method performed by a vehicle notification device that generates a notification vibration using a vibrator disposed in a seat in a vehicle interior, the method comprising:

a first signal generation step of generating, by a first signal generator, a first sweep signal by changing a frequency in a predetermined frequency range;
a measurement step of measuring, by a measurement unit, a vibration in the vehicle interior;
a frequency analysis step of calculating, by a frequency analyzer, vehicle-stop-time frequency characteristics and vehicle-travel-time frequency characteristics by measuring a vibration using the measurement unit in the vehicle interior during a vehicle stop and during vehicle travel while inputting the first sweep signal to the vibrator and detecting a frequency range in which a signal level of the vehicle-travel-time frequency characteristics is higher than a signal level of the vehicle-stop-time frequency characteristics by a predetermined level amount or more;
a second signal generation step of generating, by a second signal generator, a second sweep signal by changing a frequency in a new frequency range obtained by excluding the frequency range detected in the frequency analysis step from the predetermined frequency range in which the frequency of the first sweep signal is changed; and
a notification vibration generation step of generating, by the vibrator, the notification vibration on the basis of the second sweep signal generated in the second signal generation step.

5. The vehicle notification method according to claim 4, wherein the notification vibration generation step comprises if the frequency analyzer does not detect the frequency range in which the signal level of the vehicle-travel-time frequency characteristics is higher than the signal level of the vehicle-stop-time frequency characteristics by the predetermined level amount or more in the frequency analysis step, generating, by the vibrator, the notification vibration using the first sweep signal as the second sweep signal.

6. The vehicle notification method according to claim 4, further comprising a correction step of correcting, by a correction processor, the second sweep signal so that an amplitude value of the second sweep signal varies with time, by multiplying the second sweep signal by a correction signal whose amplitude value varies with time, wherein
the notification vibration generation step comprises generating, by the vibrator, the notification vibration on the basis of the second sweep signal corrected in the correction step.

7. The vehicle notification method according to claim 6, wherein amplitude characteristics of the correction signal used in the correction step are set on the basis of amplitude characteristics of a vibration that occurs in a vehicle when the vehicle passes over rumble strips.

* * * * *